(12) United States Patent
Kubota et al.

(10) Patent No.: US 11,888,354 B2
(45) Date of Patent: Jan. 30, 2024

(54) ROTOR FOR ROTARY ELECTRIC MACHINE

(71) Applicant: HONDA MOTOR CO., LTD., Tokyo (JP)

(72) Inventors: Yoshihisa Kubota, Saitama (JP); Masashi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 17/679,788

(22) Filed: Feb. 24, 2022

(65) Prior Publication Data

US 2022/0320925 A1   Oct. 6, 2022

(30) Foreign Application Priority Data

Mar. 31, 2021 (JP) .................. 2021-061122

(51) Int. Cl.
 *H02K 1/27* (2022.01)
 *H02K 1/276* (2022.01)
(52) U.S. Cl.
 CPC .................. *H02K 1/2766* (2013.01)
(58) Field of Classification Search
 CPC ........ H02K 1/2766; H02K 1/276; H02K 1/28; H02K 3/28; H02K 3/50; H02P 21/14
 See application file for complete search history.

(56) References Cited

U.S. PATENT DOCUMENTS

2009/0001914 A1   1/2009 Atarashi et al.
2016/0336839 A1*  11/2016 Marino ................ H02K 1/2766

FOREIGN PATENT DOCUMENTS

JP      2007-236049 A     9/2007

* cited by examiner

Primary Examiner — Thomas Truong
(74) Attorney, Agent, or Firm — Paratus Law Group, PLLC

(57) ABSTRACT

A saturation portion which is magnetically saturated during no-load operation of the rotary electric machine is formed in the rotor core at a position facing at least one of the first main surface and the second main surface of the permanent magnet when viewed in the axial direction. When viewed in the axial direction, the saturation portion includes at least one core protrusion firmed between the wall portion of the magnet accommodating hole and at least one of the first main surface and the second main surface of the permanent magnet such that a part of the rotor core extends in a direction intersecting the first main surface or the second main surface, and at least one nonmagnetic portion formed between the wall portion of the magnet accommodating hole and at least one of the first main surface and the second main surface of the permanent magnet.

6 Claims, 13 Drawing Sheets

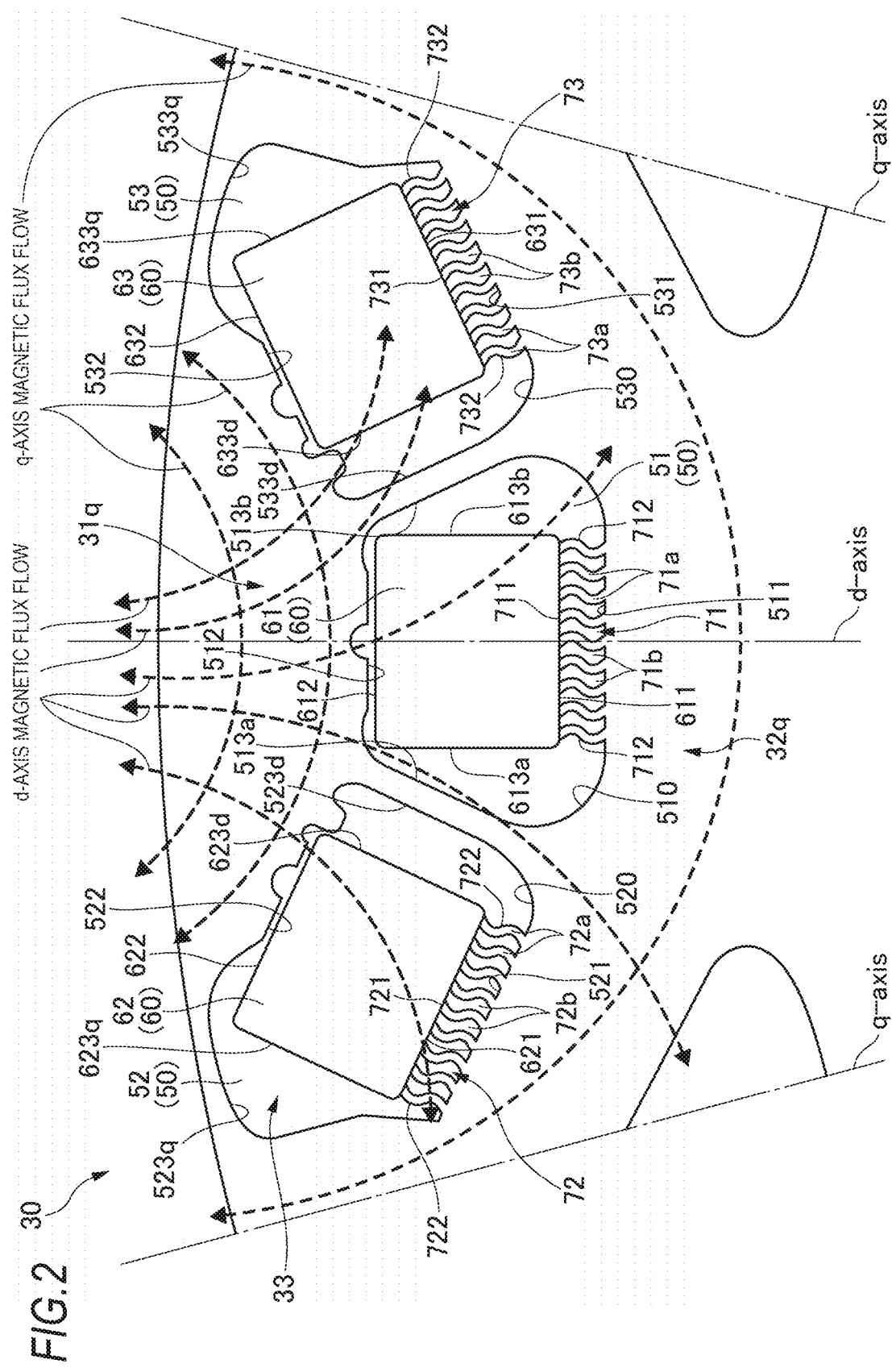

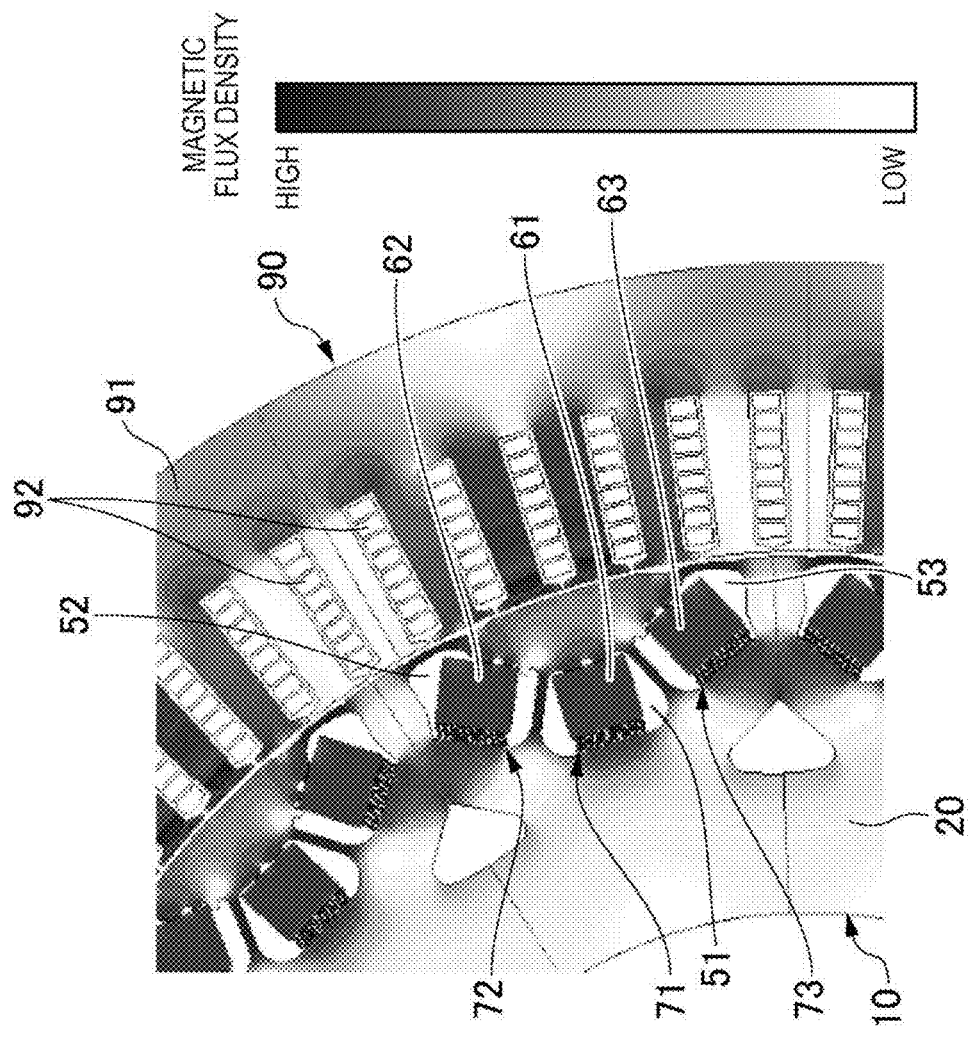

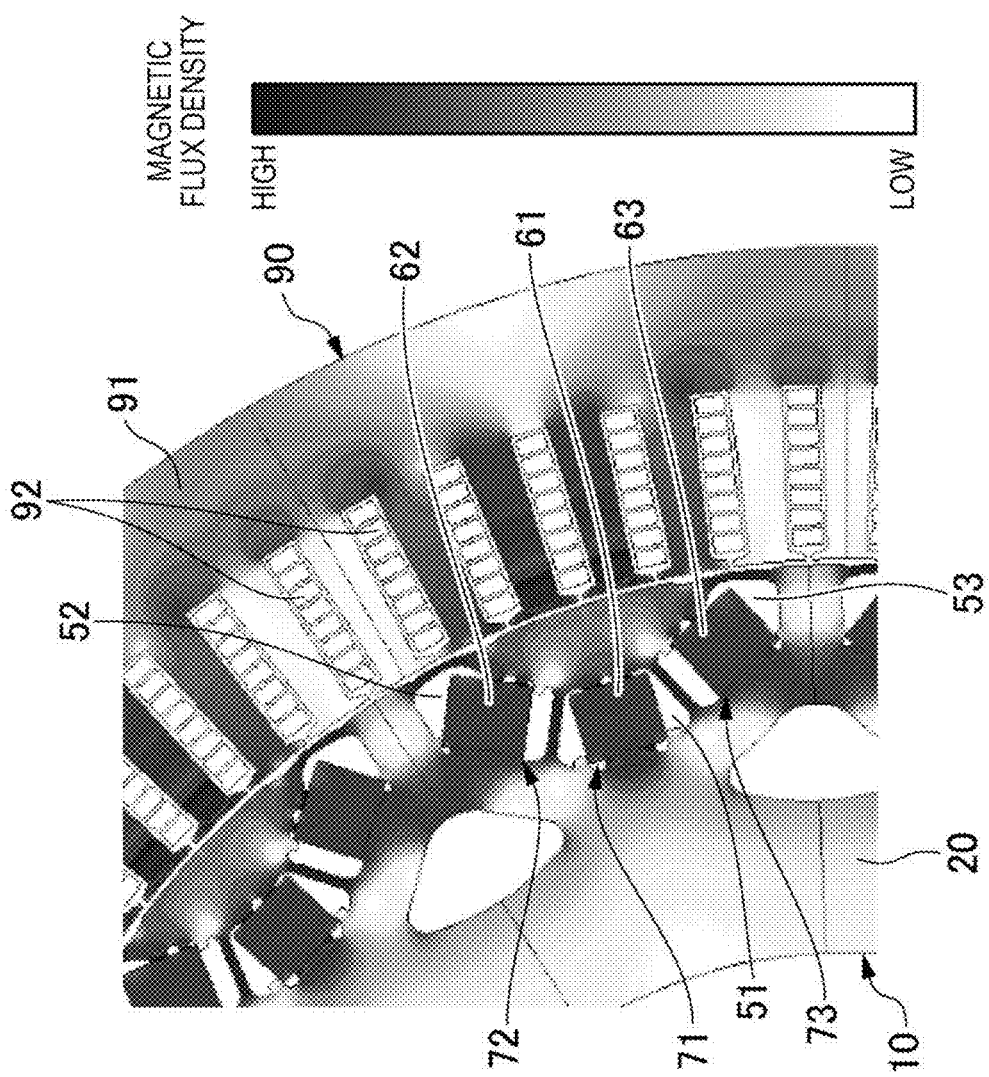

DURING NO-LOAD OPERATION

DURING HIGH-LOAD OPERATION

ROTOR FOR ROTARY ELECTRIC MACHINE

CROSS-REFERENCE TO RELATED APPLICATIONS

This application is based on and claims priority under 35 USC 119 from Japanese Patent Application No. 2021-061122 filed on Mar. 31, 2021.

TECHNICAL FIELD

The present disclosure relates to a rotor for a rotary electric machine.

BACKGROUND ART

In related art, there has been known a rotary electric machine including a stator to which a coil is attached and a rotor to which a magnet is attached. In such a rotary electric machine, a magnetic field of the stator generated by a current passing through the coil and a magnetic field of the rotor generated by the magnet attached to the rotor interact with each other to rotationally drive the rotor. In this way, since the rotary electric machine can obtain rotational power from electric energy, in recent years, electric vehicles equipped with the rotary electric machine and driven by the rotational power of the rotary electric machine, such as hybrid vehicles, electric vehicles, and fuel cell vehicles, have been widely used as efforts for realizing a low-carbon society.

In addition, the rotary electric machine mounted on the electric vehicle strongly requires energy saving and high output, and for this purpose, it is desirable to reduce loss occurring in the rotary electric machine during no-load operation and low-load operation while maintaining the maximum output torque during high-load operation.

Therefore, for example, JP-A-2007-236049 discloses a rotary electric machine including an inner peripheral side rotor and an outer peripheral side rotor. The rotary electric machine according to JP-A-2007-236049 changes a field state of the rotor for the rotary electric machine by engaging and disengaging the inner peripheral side rotor and the outer peripheral side rotor, and reduces loss occurring in the rotary electric machine during no-load operation and low-load operation while maintaining the maximum output torque during high-load operation.

However, the rotary electric machine according to JP-A-2007-236049 requires an oil passage for engaging and disengaging the inner peripheral side rotor and the outer peripheral side rotor, and a phase control device which supplies a hydraulic pressure for engaging and disengaging the inner peripheral side rotor and the outer peripheral side rotor. Therefore, the rotary electric machine according to JP-A-2007-236049 has a problem that a configuration becomes complicated.

SUMMARY

The present disclosure provides a rotor for a rotary electric machine capable of easily forming a saturation portion capable of reducing loss occurring in the rotary electric machine during no-load operation of the rotary electric machine while suppressing a decrease in maximum output torque during high-load operation of the rotary electric machine.

According to an aspect of the present disclosure, there is provided a rotor for a rotary electric machine including:

a rotor core having a substantially annular shape centered on a rotation axis; and a plurality of magnetic pole portions formed in the rotor core along a circumferential direction, in which:

each of the magnetic pole portions includes a magnet accommodating hole formed in the rotor core and extending in an axial direction, and a permanent magnet accommodated in the magnet accommodating hole;

the permanent magnet includes a first main surface extending in the axial direction and a second main surface extending in the axial direction;

the magnet accommodating hole includes a wall portion which forms a contour of the magnet accommodating hole when viewed in the axial direction;

a saturation portion which is magnetically saturated during no-load operation of the rotary electric machine is formed in the rotor core at a position facing at least one of the first main surface and the second main surface of the permanent magnet when viewed in the axial direction; and when viewed in the axial direction, the saturation portion includes:

at least one core protrusion formed between the wall portion of the magnet accommodating hole and at least one of the first main surface and the second main surface of the permanent magnet such that a part of the rotor core extends in a direction intersecting the first main surface or the second main surface; and at least one nonmagnetic portion formed between the wall portion of the magnet accommodating hole and at least one of the first main surface and the second main surface of the permanent magnet.

According to the present disclosure, in the rotor for the rotary electric machine, since the saturation portion includes the core protrusion and the nonmagnetic portion formed between the wall portion of the magnet accommodating hole and at least one of the first main surface and the second main surface of the permanent magnet when viewed in the axial direction, it is possible to reduce loss occurring in the rotary electric machine during the no-load operation of the rotary electric machine while suppressing a decrease in the maximum output torque during high-load operation of the rotary electric machine. Since the saturation portion includes the core protrusion and the nonmagnetic portion, the saturation portion can be easily formed.

BRIEF DESCRIPTION OF DRAWINGS

FIG. 2 is a front view of a magnetic pole portion of the rotor illustrated in FIG. 1.

FIG. 3A is a contour view of a magnetic flux density of the magnetic pole portion of the rotor during no-load operation of the rotary electric machine in a case where the first magnetic saturation portion, the second magnetic saturation portion, and the third magnetic saturation portion according to the present disclosure are formed, and FIG. 3B is a contour view of a magnetic flux density of the magnetic pole portion of the rotor during no-load operation of the rotary electric machine in a case where the first magnetic saturation portion, the second magnetic saturation portion, and the third magnetic saturation portion according to the present disclosure are not formed.

DESCRIPTION OF EMBODIMENTS

Figure 1:
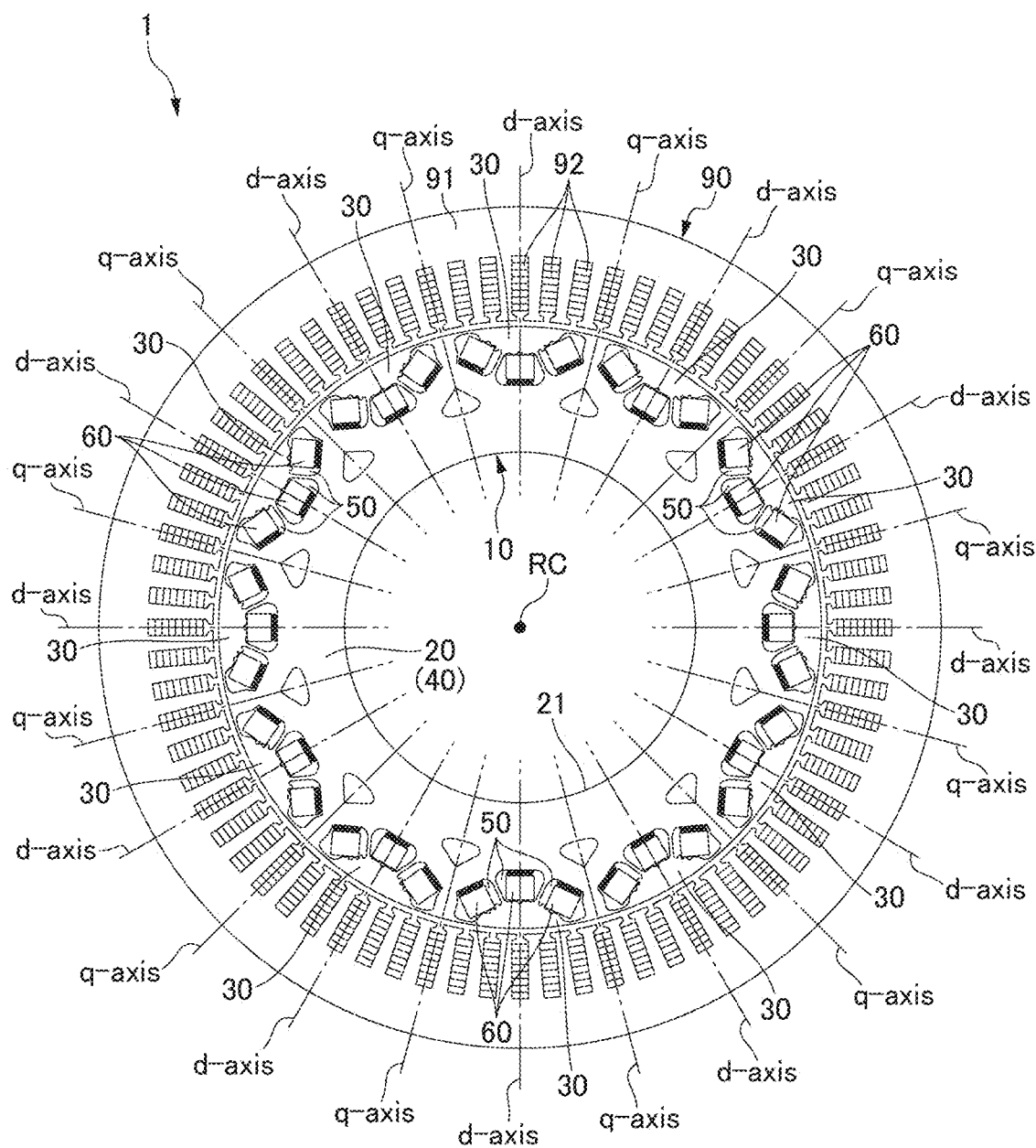
FIG. 1 is a front view of a rotary electric machine including a rotor for the rotary electric machine according to a first embodiment of the present disclosure.

Hereinafter, embodiments of a rotary electric machine including a rotor for the rotary electric machine according to the present disclosure will be described with reference to the accompanying drawings. It should be noted that the drawings are viewed in a direction of reference numerals. In addition, in the present specification and the like, unless otherwise specified, the terms "axial direction", "radial direction", and "circumferential direction" refer to directions based on a rotation axis of the rotor. An axially inner side refers to a central side of the rotary electric machine in the axial direction, and an axially outer side refers to a side away from a center of the rotary electric machine in the axial direction. A circumferentially inner side refers to a circumferentially central side of a magnetic pole portion, and a circumferentially outer side refers to a side away from a circumferential center of the magnetic pole portion.

First Embodiment

First, a rotor for a rotary electric machine according to a first embodiment of the present disclosure will be described with reference to FIGS. 1 to 6.

<Rotary Electric Machine>

As illustrated in FIG. 1, a rotary electric machine 1 according to the present embodiment includes a substantially annular rotor 10 which rotates about a rotation axis RC as a rotation axis and is centered on the rotation axis RC, and a stator 90 which is disposed so as to surround an outer circumferential surface of the rotor 10.

<Rotor>

As illustrated in FIG. 1, the rotor 10 for the rotary electric machine according to the present embodiment includes a rotor core 20 having a substantially annular shape centered on the rotation axis RC, and a plurality of magnetic pole portions 30 formed in the rotor core 20 along a circumferential direction.

The rotor core 20 has the substantially annular shape centered on the rotation axis RC. An inner circumferential surface 21 of the rotor core 20 is a wall surface of a rotor shaft hole in which a rotor shaft (not illustrated) is tightened into annular inside of the rotor core 20 by press-fitting or the like.

The rotor core 20 is formed by laminating a plurality of electromagnetic steel sheets 40, each of which has a substantially annular shape centered on the rotation axis RC in an axial direction.

The plurality of magnetic pole portions 30 are formed at equal intervals along the circumferential direction. In the present embodiment, twelve magnetic pole portions 30 are formed at equal intervals along the circumferential direction, that is, at intervals of 30 degrees.

In the present specification and the like, when viewed in the axial direction, an axis extending radially through a circumferential center of each magnetic pole portion 30 is defined as a d-axis (d-axis in the drawing), and an axis extending radially through a circumferential end portion of each magnetic pole portion 30 and separated from the d-axis by an electrical angle of 90 degrees is defined as a q-axis (q-axis in the drawing).

Each magnetic pole portion 30 has magnet accommodating holes 50 formed in the rotor core 20 and extending in the axial direction, and permanent magnets 60 accommodated in the magnet accommodating holes 50, respectively. In the present embodiment, each magnetic pole portion 30 has three magnet accommodating holes 50 and three permanent magnets 60 accommodated in the three magnet accommodating holes 50, respectively.

<Stator>

The stator 90 includes a substantially annular stator core 91 disposed at a predetermined interval radially from an outer circumferential surface of the rotor 10, and stator coils 92 attached to the stator core 91.

When a current is supplied to the stator coil 92, a magnetic field is generated in the stator 90. The magnetic field generated in the stator 90 and a magnetic field generated by the permanent magnet 60 of each magnetic pole portion 30 of the rotor 10 interact with each other, thereby rotating the rotor 10. In this way, the rotary electric machine 1 is rotationally driven.

<Magnetic Pole Portion>

As illustrated in FIG. 2, when viewed in the axial direction, the magnet accommodating holes 50 formed in each magnetic pole portion 30 include a first magnet accommodating hole 51 extending in the circumferential direction so as to be substantially orthogonal to the d-axis and having a shape substantially symmetrical with respect to the d-axis, a second magnet accommodating hole 52 formed on one side in the circumferential direction (counterclockwise side in FIG. 2) with respect to the d-axis and on an outer side in the circumferential direction of the first magnet accommodating hole 51, and a third magnet accommodating hole 53 formed on the other side in the circumferential direction (clockwise side in FIG. 2) with respect to the d-axis and on an outer side in the circumferential direction of the first magnet accommodating hole 51. The second magnet accommodating hole 52 and the third magnet accommodating hole 53 are disposed in a substantially V-shape in which a distance in the circumferential direction increases radially outward. Therefore, the second magnet accommodating hole 52 extends so as to be inclined with respect to the circumferential direction, that is, toward the outer side in the circumferential direction and radially outward. The third, magnet accommodating hole 53 extends so as to be inclined with respect to the circumferential direction, that is, toward the outer side in the circumferential direction and radially outward. The second magnet accommodating hole 52 and the third magnet accommodating hole 53 are disposed such that circumferentially inner end portions thereof face circumferential end portions of the first magnet accommodating hole 51 in the circumferential direction.

The three permanent magnets 60 include a first permanent magnet 61 accommodated in the first magnet accommodating hole 51, a second permanent magnet 62 accommodated in the second magnet accommodating hole 52, and a third permanent magnet 63 accommodated in the third magnet accommodating hole 53. Each of the first permanent magnet 61, the second permanent magnet 62, and the third permanent magnet 63 has a substantially rectangular cross section when viewed in the axial direction, and has a flat plate shape extending in the axial direction.

When viewed in the axial direction, the first permanent magnet 61 has a rectangular shape whose longitudinal direction is a direction substantially orthogonal to the d-axis. The first permanent magnet 61 includes an inner surface 611 facing radially inward and extending in the axial direction, an outer surface 612 facing radially outward and extending in the axial direction, a first end surface 613*a* connecting the inner surface 611 and the outer surface 612 on one circumferential end side and extending in the axial direction, and a second end surface 613*b* connecting the inner surface 611 and the outer surface 612 on the other circumferential end side and extending in the axial direction. The first permanent magnet 61 is magnetized in a direction orthogonal to the inner surface 611 and the outer surface 612 when viewed in the axial direction.

The first magnet accommodating hole 51 includes a wall portion 510 which forms a contour of the first magnet accommodating hole 51 when viewed in the axial direction. When viewed in the axial direction, the wall portion 510 includes an inner wall portion 511 facing the inner surface 611 of the first permanent magnet 61 and extending in the axial direction, an outer wall portion 512 facing the outer surface 612 of the first permanent magnet 61 and extending in the axial direction, a first end wall portion 513*a* connecting an end portion of the inner wall portion 511 on one side in the circumferential direction and an end portion of the outer wall portion 512 on one side in the circumferential direction and extending in the axial direction, and a second end wall portion 513*b* connecting an end portion of the inner wall portion 511 on the other side in the circumferential direction and an end portion on the other side of the outer wall portion 512 in the circumferential direction and extending in the axial direction. When viewed in the axial direction, the first end wall portion 513*a* and the second end wall portion 513*b* extend so as to be inclined toward a d-axis side from end portions of the inner wall portion 511 toward end portions of the outer wall portion 512.

When viewed in the axial direction, the second permanent magnet 62 extends so as to be inclined with respect to the circumferential direction on one side in the circumferential direction with respect to the d-axis (counterclockwise side in FIG. 2), that is, toward the outer side in the circumferential direction and radially outward, and has a substantially rectangular shape whose longitudinal direction is the extending direction. The second permanent magnet 62 includes an inner surface 621 facing radially inward and extending in the longitudinal direction and the axial direction, an outer surface 622 facing radially outward and extending in the longitudinal direction and the axial direction, a d-axis side end surface 623*d* connecting an end portion of the inner surface 621 on the d-axis side and an end portion of the outer surface 622 on the d-axis side and extending in the axial direction, and a q-axis side end surface 623*q* connecting an end portion of the inner surface 621 on a q-axis side and an end portion of the outer surface 622 on the q-axis side and extending in the axial direction. The second permanent magnet 62 is disposed such that the q-axis side end surface 623*q* is located radially outward of the first permanent magnet 61. The second permanent magnet 62 is magnetized in a direction orthogonal to the inner surface 621 and the outer surface 622 when viewed in the axial direction.

The second magnet accommodating hole 52 includes a wall portion 520 which forms a contour of the second magnet accommodating hole 52 when viewed in the axial direction. When viewed in the axial direction, the wall portion 520 includes an inner wall portion 521 facing the inner surface 621 of the second permanent magnet 62 and extending in the axial direction, an outer wall portion 522 facing the outer surface 622 of the second permanent magnet 62 and extending in the axial direction, a d-axis side wall portion 523*d* connecting an end portion of the inner wall portion 521 on the d-axis side and an end portion of the outer wall portion 522 on the d-axis side and extending in the axial direction, and a q-axis side wall portion 523*q* connecting an end portion of the inner wall portion 521 on the q-axis side and an end portion of the outer wall portion 522 on the q-axis side and extending in the axial direction. The d-axis side wall portion 523*d* extends to face the first end wall portion 513*a* of the first magnet accommodating hole 51. When viewed in the axial direction, the q-axis side wall portion 523*q* extends from the end portion of the inner wall portion 521 and the end portion of the outer wall portion 522 so as to be largely curved toward an outer side in a longitudinal direction of the second permanent magnet 62, and a flux barrier is formed on the outer side in the longitudinal direction of the q-axis side end surface 623*q* of the second permanent magnet 62.

When viewed in the axial direction, the third permanent magnet 63 extends so as to be inclined with respect to the circumferential direction on the other side in the circumferential direction with respect to the d-axis (clockwise side in FIG. 2), that is, toward the outer side in the circumferential direction and radially outward, and has a substantially rectangular shape whose longitudinal direction is an extending direction. The third permanent magnet 63 includes an inner surface 631 facing radially inward and extending in the longitudinal direction and the axial direction, an outer surface 632 facing radially outward and extending in the longitudinal direction and the axial direction, a d-axis side end surface 633*d* connecting an end portion of the inner surface 631 on the d-axis side and an end portion of the outer surface 632 on the d-axis side and extending in the axial direction, and a q-axis side end surface 633*q* connecting an end portion of the inner surface 631 on the q-axis side and an end portion of the outer surface 632 on the q-axis side and extending in the axial direction. The third permanent magnet 63 is disposed such that the q-axis side end surface 633q is located radially outward of the first permanent magnet 61. The third permanent magnet 63 is magnetized in a direction orthogonal to the inner surface 631 and the outer surface 632 when viewed in the axial direction.

The third magnet accommodating hole 53 includes a wall portion 530 which forms a contour of the third magnet accommodating hole 53 when viewed in the axial direction. When viewed in the axial direction, the wall portion 530 includes an inner wall portion 531 facing the inner surface 631 of the third permanent magnet 63 and extending in the axial direction, an outer wall portion 532 facing the outer surface 632 of the third permanent magnet 63 and extending in the axial direction, a d-axis side wall portion 533d connecting an end portion of the inner wall portion 531 on the d-axis side and an end portion of the outer wall portion 532 on the d-axis side and extending in the axial direction, and a q-axis side wall portion 533q connecting an end portion of the inner wall portion 531 on the q-axis side and an end portion of the outer wall portion 532 on the q-axis side and extending in the axial direction. The d-axis side wall portion 533d extends to face the second end wall portion 513b of the first magnet accommodating hole 51. When viewed in the axial direction, the q-axis side wall portion 533q extends from the end portion of the inner wall portion 531 and the end portion of the outer wall portion 532 so as to be largely curved toward an outer side in a longitudinal direction of the third permanent magnet 63, and a flux barrier is formed on the outer side in the longitudinal direction of the q-axis side end surface 633q of the third permanent magnet 63.

In the magnetic pole portion 30, a first q-axis magnetic path 31q through which a q-axis interlinkage magnetic flux generated by a q-axis current flowing through the stator coil 92 passes is formed radially outward of the first magnet accommodating hole 51, the second magnet accommodating hole 52, and the third magnet accommodating hole 53. In the magnetic pole portion 30, a second q-axis magnetic path 32q through which a q-axis interlinkage magnetic flux generated by a q-axis current flowing through the stator coil 92 passes is formed radially inside the first magnet accommodating hole 51, the second magnet accommodating hole 52, and the third magnet accommodating hole 53. Therefore, the first q-axis magnetic path 31q and the second q-axis magnetic path 32q are formed outside the first magnet accommodating hole 51, the second magnet accommodating hole 52, and the third magnet accommodating hole 53. The q-axis interlinkage magnetic flux passes through the first q-axis magnetic path 31q while being curved in a convex shape convex radially inward along the outer wall portion 512 of the first magnet accommodating hole 51, the outer wall portion 522 of the second magnet accommodating hole 52, and the outer wall portion 532 of the third magnet accommodating hole 53. The q-axis interlinkage magnetic flux passes through the second q-axis magnetic path 32q while being curved in a convex shape convex radially inward along the inner wall portion 511 of the first magnet accommodating hole 51, the inner wall portion 521 of the second magnet accommodating hole 52, and the inner wall portion 531 of the third magnet accommodating hole 53.

In the magnetic pole portion 30, a flux barrier region 33 is formed between the first q-axis magnetic path 31q and the second q-axis magnetic path 32q. The flux barrier region 33 is a region which includes the first magnet accommodating hole 51, the second magnet accommodating hole 52, and the third magnet accommodating hole 53, and is curved in a convex shape radially inward along the first q-axis magnetic path 31q and the second q-axis magnetic path 32q. The flux barrier region 33 is preferably formed such that the q-axis magnetic flux does not pass therethrough as much as possible.

<Magnetic Saturation Portion>

Loss occurring in the rotary electric machine 1 includes iron loss and copper loss. The iron loss is loss which occurs due to physical properties of the rotor core 20 and the stator core 91. The copper loss is loss which occurs due to a resistance component of the stator coil 92. During no-load operation in which no electric power is supplied to the stator coil 92 and during low-load operation in which the electric power supplied to the stator coil 92 is small, the loss occurring in the rotary electric machine 1 is such that the copper loss is small and the iron loss is dominant since a current flowing through the stator coil 92 is zero or small. On the other hand, during high-load operation in which the electric power supplied to the stator coil 92 is large, the loss occurring in the rotary electric machine 1 such that the copper loss is dominant since a current flowing through the stator coil 92 is large.

Therefore, it is desirable that the rotary electric machine 1 reduces the iron loss by reducing the magnetic flux generated from the permanent magnet 60 during the no-load operation and the low-load operation while suppressing a decrease in the maximum output torque during the high-load operation.

(First Magnetic Saturation Portion)

A first magnetic saturation portion 71 is formed in the first magnet accommodating hole 51 at a position facing at least one of the inner surface 611 and the outer surface 612 of the first permanent magnet 61. In the present embodiment, the first magnetic saturation portion 71 is formed at a position facing the inner surface 611 of the first permanent magnet 61. When viewed in the axial direction, the first magnetic saturation portion 71 extends to face a facing surface of the first permanent magnet 61 facing the first magnetic saturation portion 71, that is, the inner surface 611 of the first permanent magnet 61 in the present embodiment.

The first magnetic saturation portion 71 includes a plurality of protrusions 71a in which a part of the rotor core 20 protrudes from the inner wall portion 511 of the first magnet accommodating hole 51 toward the inner surface 611 of the first permanent magnet 61 and which are formed along an extending direction of the first magnetic saturation portion 71, and a plurality of voids 71b formed between the adjacent protrusions 71a along the extending direction of the first magnetic saturation portion 71.

In the present embodiment, the protrusion 71a protrudes from the inner wall portion 511 of the first magnet accommodating hole 51 toward the inner surface 611 of the first permanent magnet 61 by being curved in a wave shape in the circumferential direction.

In this way, the first magnetic saturation portion 71 is formed inside the wall portion 510 of the first magnet accommodating hole 51 when viewed in the axial direction. When viewed in the axial direction, the first magnetic saturation portion 71 protrudes from the inner wall portion 511 of the first magnet accommodating hole 51 toward the first permanent magnet 61, and extends to face the inner surface 611 of the first permanent magnet. The first magnetic saturation portion 71 includes the protrusions 71a formed by a part of the rotor core 20, and the voids 71b formed between the inner wall portion 511 of the first magnet accommodating hole 51 and the inner surface 611 of the first permanent magnet 61.

Figure 11:
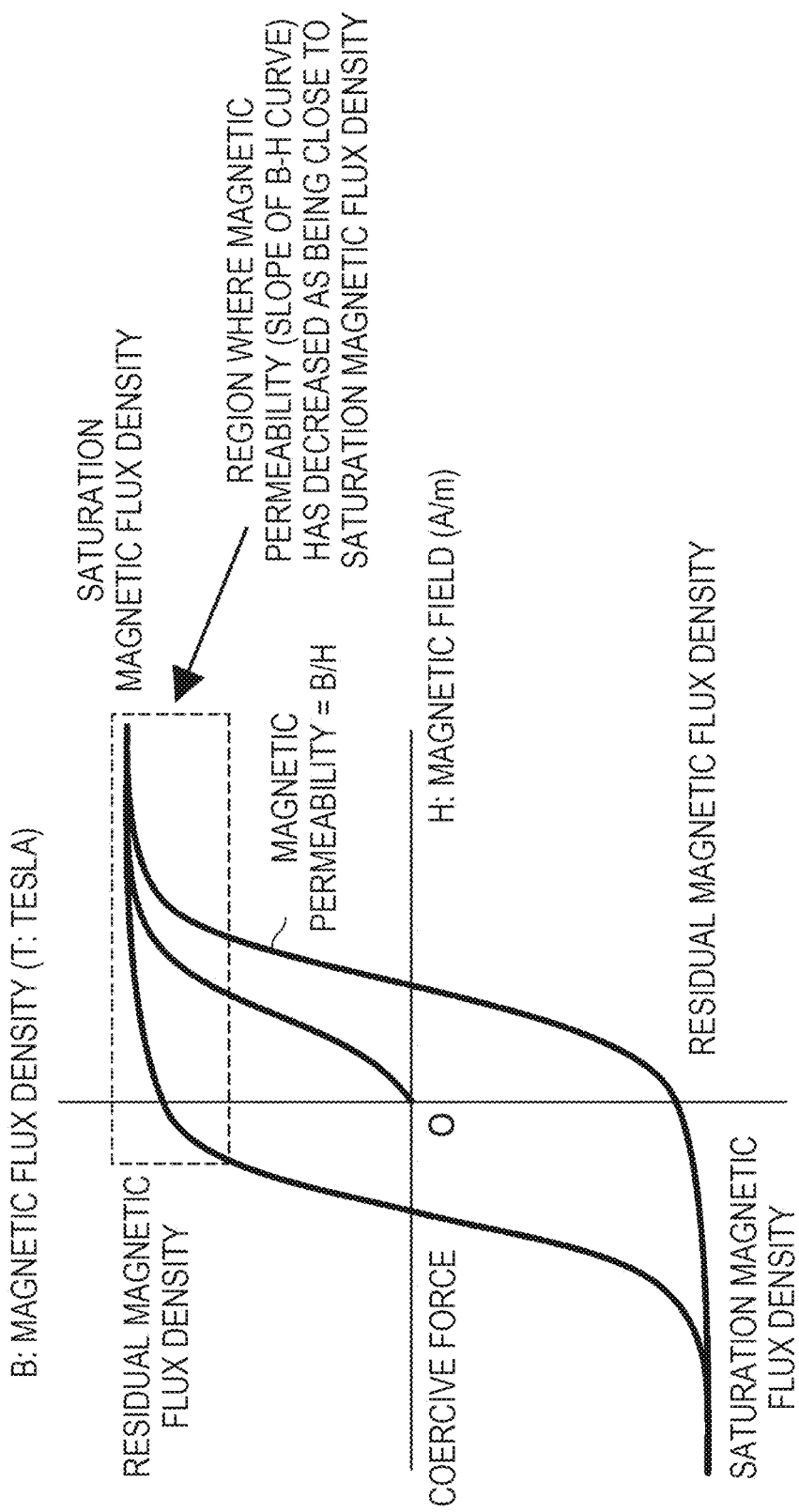
FIG. 11 is a diagram illustrating a B-H curve in which a vertical axis represents a magnetic flux density B and a horizontal axis represents a magnetic field H, and a state in which a magnetic permeability, that is, a slope of the B-H curve starts to decrease in each of the first magnetic saturation portion, the second magnetic saturation portion, and the third magnetic saturation portion according to the present disclosure.

The first magnetic saturation portion 71 is formed so as to be magnetically saturated during the no-load operation of the rotary electric machine 1. Magnetic saturation refers to a state in which a magnetic flux density of a magnetic field generated in a magnetization direction of the first permanent magnet 61 is close to a saturation magnetic flux density of the first magnetic saturation portion 71, and in the first magnetic saturation portion 71, a magnetic permeability, that is, a slope of a B-H curve in which a vertical axis represents a magnetic flux density B and a horizontal axis represents a magnetic field H illustrated in FIG. 11 starts to decrease.

As described above, the rotor core 20 is formed by laminating the plurality of electromagnetic steel sheets 40 having the substantially annular shape centered on the rotation axis RC in the axial direction. However, since a relative permeability of the voids 71b is lower than that of the electromagnetic steel sheets 40, the saturation magnetic flux density of the first magnetic saturation portion 71 is lower than that of a portion of the rotor core 20 in which the electromagnetic steel sheets 40 are laminated in the axial direction without forming the voids.

Therefore, as illustrated in FIGS. 3A and 3B, the first magnetic saturation portion 71 is more likely to be magnetically saturated than the portion in which the electromagnetic steel sheets 40 are laminated in the axial direction without forming the voids. Therefore, during the no-load operation of the rotary electric machine 1, the first magnetic saturation portion 71 can be formed to be magnetically saturated while the second q-axis magnetic path 32q of the rotor core 20 is not magnetically saturated.

Since the first magnetic saturation portion 71 is formed so as to be magnetically saturated during the no-load operation of the rotary electric machine 1, the first magnetic saturation portion 71 is magnetically saturated by a magnetic flux generated from the first permanent magnet 61 during the no-load operation of the rotary electric machine 1, a magnetic resistance of the first magnetic saturation portion 71 increases, and the magnetic flux generated in the magnetization direction of the first permanent magnet 61 decreases as compared with a case where the first magnetic saturation portion 71 is not formed.

Since the iron loss is dominant in the loss occurring in the rotary electric machine 1 during the no-load operation of the rotary electric machine 1, the loss occurring in the rotary electric machine 1 during the no-load operation of the rotary electric machine 1 can be reduced by the first magnetic saturation portion 71.

Figure 4A:
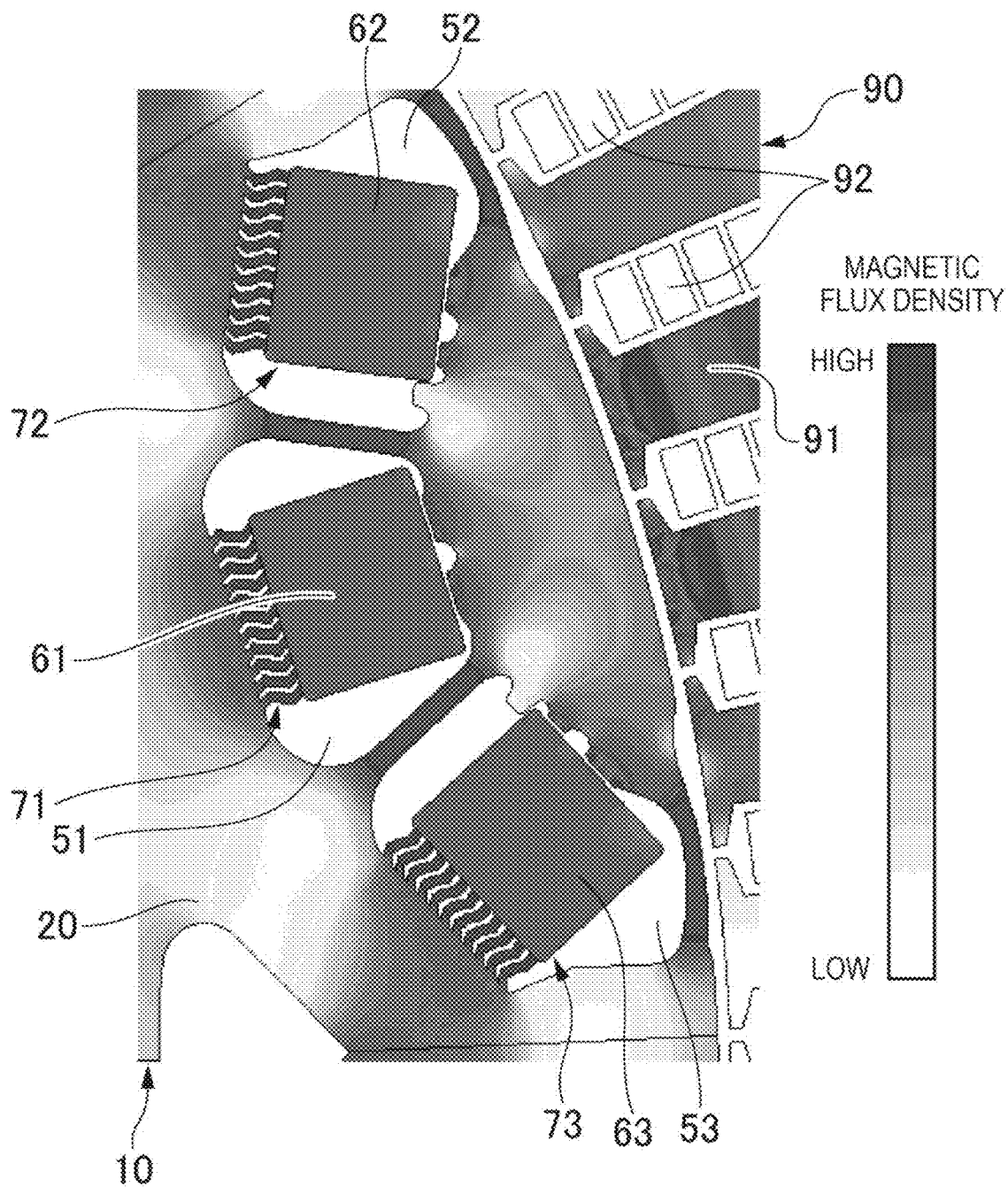
FIG. 4A is a contour view of a magnetic flux density of the magnetic pole portion of the rotor according to the present disclosure during no-load operation of the rotary electric machine.
Figure 4B:
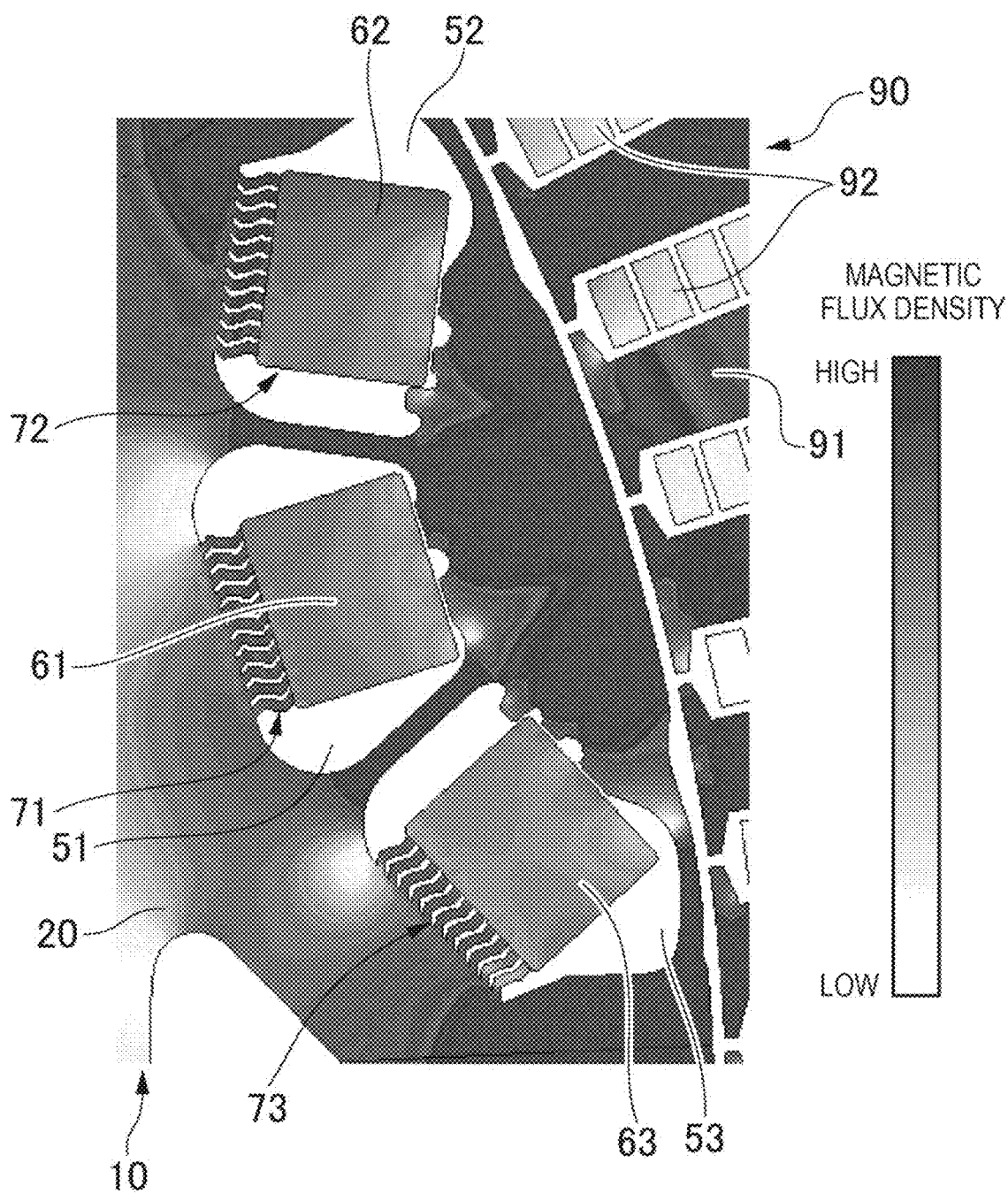
FIG. 4B is a contour view of a magnetic flux density of the magnetic pole portion of the rotor according to the present disclosure during high-load operation of the rotary electric machine.

On the other hand, as illustrated in FIGS. 4A and 4B, during the high-load operation of the rotary electric machine 1, a large current is supplied to the stator coil 92, and a large magnetic field is generated from the stator 90. At this time, a magnetic flux generated in the magnetization direction of the first permanent magnet 61 is offset by a d-axis interlinkage magnetic flux generated by a negative d-axis current flowing through the stator coil 92, and thus is reduced as compared with a case of the no-load operation of the rotary electric machine 1. Therefore, even if the first magnetic saturation portion 71 is formed such that the magnetic saturation occurs during the no-load operation of the rotary electric machine 1, magnetic saturation can be prevented from occurring in the first magnetic saturation portion 71 during the high-load operation of the rotary electric machine 1. Therefore, even if the first magnetic saturation portion 71 is formed, the magnetic flux generated in the magnetization direction of the first permanent magnet 61 during the high-load operation of the rotary electric machine is substantially the same as that in the case where the first magnetic saturation portion 71 is not formed, and the rotary electric machine 1 can suppress a decrease in the maximum output torque during the high-load operation.

In this way, in the rotor 10 for the rotary electric machine 1, since the first magnetic saturation portion 71 is formed in the first magnet accommodating hole 51, it is possible to reduce the loss occurring in the rotary electric machine 1 during the no-load operation and the low-load operation of the rotary electric machine 1 while suppressing the decrease in the maximum output torque during the high-load operation of the rotary electric machine 1. Since the first magnetic saturation portion 71 includes the protrusions 71a formed by a part of the rotor core 20, and the voids 71b formed between the inner wall portion 511 of the first magnet accommodating hole 51 and the first permanent magnet 61, the first magnetic saturation portion 71 can be easily formed. Since a proportion of the protrusions 71a in the first magnetic saturation portion 71 and a proportion of the voids 71b in the first magnetic saturation portion 71 can be easily adjusted, the saturation magnetic flux density of the first magnetic saturation portion 71 can be easily adjusted.

Since the first magnetic saturation portion 71 includes the protrusions 71a in which a part of the rotor core 20 protrudes from the inner wall portion 511 of the first magnet accommodating hole 51 toward the inner surface 611 of the first permanent magnet 61, and the voids 71b formed between the adjacent protrusions 71a, it is possible to form the first magnetic saturation portion 71 while suppressing an increase in man-hours for manufacturing the rotor 10 by punching the electromagnetic steel sheets 40 into a desired shape.

Returning to FIG. 2, the first magnetic saturation portion 71 includes a main surface 711 extending to face the inner surface 611 of the first permanent magnet 61, and a pair of side surfaces 712 extending from both end portions of the main surface 711 toward the inner wall portion 511 of the first magnet accommodating hole 51 while facing outward in the extending direction of the first magnetic saturation portion 71. The pair of side surfaces 712 are formed so as to be exposed to inside of the first magnet accommodating hole 51.

In the present embodiment, the main surface 711 is formed by distal end surfaces of the plurality of protrusions 71a. The pair of side surfaces 712 are formed by surfaces, facing outward in the extending direction of the first magnetic saturation portion 71, of the protrusions 71a formed at both ends in the extending direction of the first magnetic saturation portion 71.

The first permanent magnet 61 is disposed in the first magnet accommodating hole 51 at a position where both end portions of the inner surface 611 are spaced apart from the wall portion 510 of the first magnet accommodating hole 51 when viewed in the axial direction. In other words, in the first magnet accommodating hole 51, the first permanent magnet 61 is disposed at a position where both end portions of the inner surface 611 do not come into contact with any of the inner wall portion 511, the outer wall portion 512, the first end wall portion 513a, and the second end wall portion 513b of the first magnet accommodating hole 51 when viewed in the axial direction.

Therefore, the first magnetic saturation portion 71 is disposed in the flux barrier region 33 including the first magnet accommodating hole 51, the second magnet accommodating hole 52, and the third magnet accommodating hole 53, in this way, the first magnetic saturation portion 71 is formed at a position avoiding the first q-axis magnetic path 31q and the second q-axis magnetic path 32q.

Accordingly, since the first magnetic saturation portion 71 is disposed at a position where the q-axis interlinkage magnetic flux generated by the q-axis current flowing through the stator coil 92 is not reduced, it is possible to provide the first magnetic saturation portion 71 while suppressing the decrease in the maximum output torque during the high-load operation of the rotary electric machine 1.

(Second Magnetic Saturation Portion)

A second magnetic saturation portion 72 is formed in the second magnet accommodating hole 52 at a position facing at least one of the inner surface 621 and the outer surface 622 of the second permanent magnet 62. In the present embodiment, the second magnetic saturation portion 72 is formed at a position facing the inner surface 621 of the second permanent magnet 62. When viewed in the axial direction, the second magnetic saturation portion 72 extends to face a facing surface of the second permanent magnet 62 facing the second magnetic saturation portion 72, that is, the inner surface 621 of the second permanent magnet 62 in the present embodiment.

The second magnetic saturation portion 72 includes a plurality of protrusions 72a in which a part of the rotor core 20 protrudes from the inner wall portion 521 of the second magnet accommodating hole 52 toward the inner surface 621 of the second permanent magnet 62 and which are formed along an extending direction of the second magnetic saturation portion 72, and a plurality of voids 72b formed between the adjacent protrusions 72a along the extending direction of the second magnetic saturation portion 72.

In the present embodiment, the protrusion 72a protrudes from the inner wall portion 521 of the second magnet accommodating hole 52 toward the inner surface 621 of the second permanent magnet 62 by being curved in a wave shape in the circumferential direction.

In this way, the second magnetic saturation portion 72 is formed inside the wall portion 520 of the second magnet accommodating hole 52 when viewed in the axial direction. When viewed in the axial direction, the second magnetic saturation portion 72 protrudes from the inner wall portion 521 of the second magnet accommodating hole 52 toward the second permanent magnet 62, and extends to face the inner surface 621 of the second permanent magnet. The second magnetic saturation portion 72 includes the protrusions 72a formed by a part of the rotor core 20, and the voids 72b formed between the inner wall portion 521 of the second magnet accommodating hole 52 and the inner surface 621 of the second permanent magnet 62.

The second magnetic saturation portion 72 is formed so as to be magnetically saturated during the no-load operation of the rotary electric machine 1. Magnetic saturation refers to a state in which a magnetic flux density of a magnetic field generated in a magnetization direction of the second permanent magnet 62 is close to a saturation magnetic flux density of the second magnetic saturation portion 72, and in the second magnetic saturation portion 72, a magnetic permeability, that is, a slope of the B-H curve in which the vertical axis represents the magnetic flux density B and the horizontal axis represents the magnetic field H illustrated in FIG. 11 starts to decrease.

As described above, the rotor core 20 is formed by laminating the plurality of electromagnetic steel sheets 40 having the substantially annular shape centered on the rotation axis RC in the axial direction. However, since a relative permeability of the voids 72b is lower than that of the electromagnetic steel sheets 40, the saturation magnetic flux density of the second magnetic saturation portion 72 is lower than that of a portion of the rotor core 20 in which the electromagnetic steel sheets 40 are laminated in the axial direction without forming the voids.

Therefore, as illustrated in FIGS. 3A and 3B, the second magnetic saturation portion 72 is more likely to be magnetically saturated than the portion in which the electromagnetic steel sheets 40 are laminated in the axial direction without forming the voids. Therefore, during the no-load operation of the rotary electric machine 1, the second magnetic saturation portion 72 can be formed to be magnetically saturated while the second q-axis magnetic path 32q of the rotor core 20 is not magnetically saturated.

Since the second magnetic saturation portion 72 is formed so as to be magnetically saturated during the no-load operation of the rotary electric machine 1, the second magnetic saturation portion 72 is magnetically saturated by a magnetic flux generated from the second permanent magnet 62 during the no-load operation of the rotary electric machine 1, a magnetic resistance of the second magnetic saturation portion 72 increases, and the magnetic flux generated in the magnetization direction of the second permanent magnet 62 decreases as compared with a case where the second magnetic saturation portion 72 is not formed.

Since the iron loss is dominant in the loss occurring in the rotary electric machine 1 during the no-load operation of the rotary electric machine 1, the loss occurring in the rotary electric machine 1 during the no-load operation of the rotary electric machine 1 can be reduced by the second magnetic saturation portion 72.

On the other hand, as illustrated in FIGS. 4A and 4B, during the high-load operation of the rotary electric machine 1, a large current is supplied to the stator coil 92, and a large magnetic field is generated from the stator 90. At this time, a magnetic flux generated in the magnetization direction of the second permanent magnet 62 is offset by a d-axis interlinkage magnetic flux generated by a negative d-axis current flowing through the stator coil 92, and thus is reduced as compared with the case of the no-load operation of the rotary electric machine 1. Therefore, even if the second magnetic saturation portion 72 is formed such that the magnetic saturation occurs during the no-load operation of the rotary electric machine 1, magnetic saturation can be prevented from occurring in the second magnetic saturation portion 72 during the high-load operation of the rotary electric machine 1. Therefore, even if the second magnetic saturation portion 72 is formed, the magnetic flux generated in the magnetization direction of the second permanent magnet 62 during the high-load operation of the rotary electric machine 1 is substantially the same as that in the case where the second magnetic saturation portion 72 is not formed, and the rotary electric machine 1 can suppress a decrease in the maximum output torque during the high-load operation.

In this way, in the rotor 10 for the rotary electric machine 1, since the second magnetic saturation portion 72 is formed in the second magnet accommodating hole 52, it is possible to reduce the loss occurring in the rotary electric machine 1 during the no-load operation and the low-load operation of the rotary electric machine 1 while suppressing the decrease in the maximum output torque during the high-load operation of the rotary electric machine 1. Since the second magnetic saturation portion 72 includes the protrusions 72a formed by a part of the rotor core 20, and the voids 72b formed between the inner wall portion 521 of the second magnet accommodating hole 52 and the second permanent magnet 62, the second magnetic saturation portion 72 can be easily formed. Since a proportion of the protrusions 72a in the second magnetic saturation portion 72 and a proportion of the voids 72b in the second magnetic saturation portion 72 can be easily adjusted, the saturation magnetic flax density of the second magnetic saturation portion 72 can be easily adjusted.

Since the second magnetic saturation portion 72 includes the protrusions 72a in which a part of the rotor core 20 protrudes from the inner wall portion 521 of the second magnet accommodating hole 52 toward the inner surface 621 of the second permanent magnet 62, and the voids 72b formed between the adjacent protrusions 72a, it is possible to form the second magnetic saturation portion 72 while suppressing an increase in man-hours for manufacturing the rotor 10 by punching the electromagnetic steel sheets 40 into a desired shape.

Returning to FIG. 2, the second magnetic saturation portion 72 includes a main surface 721 extending to face the inner surface 621 of the second permanent magnet 62, and a pair of side surfaces 722 extending from both end portions of the main surface 721 toward the inner wall portion 521 of the second magnet accommodating hole 52 while facing outward in the extending direction of the second magnetic saturation portion 72. The pair of side surfaces 722 are formed so as to be exposed to inside of the second magnet accommodating hole 52.

In the present embodiment, the main surface 721 is formed h distal end surfaces of the plurality of protrusions 72a. The pair of side surfaces 722 are formed by surfaces, facing outward in the extending direction of the second magnetic saturation portion 72, of the protrusions 72a formed at both ends in the extending direction of the second magnetic saturation portion 72.

The second permanent magnet 62 is disposed in the second magnet accommodating hole 52 at a position where both end portions of the inner surface 621 are spaced apart from the wall portion 520 of the second magnet accommodating hole 52 when viewed in the axial direction. In other words, in the second magnet accommodating hole 52, the second permanent magnet 62 is disposed at a position where both end portions of the inner surface 621 do not come into contact with any of the inner wall portion 521, the outer wall portion 522, the d-axis side wall portion 523d, and the q-axis side wall portion 523q of the second magnet accommodating hole 52 when viewed in the axial direction.

Therefore, the second magnetic saturation portion 72 is disposed in the flux barrier region 33 including the first magnet accommodating hole 51, the second magnet accommodating hole 52, and the third magnet accommodating hole 53. In this way, the second magnetic saturation portion 72 is formed at a position avoiding the First q-axis magnetic path 31q and the second q-axis magnetic path 32q.

Accordingly, since the second magnetic saturation portion 72 is disposed at a position where the q-axis interlinkage magnetic flux generated by the q-axis current flowing through the stator coil 92 is not reduced, it is possible to provide the second magnetic saturation portion 72 while suppressing the decrease in the maximum output torque during the high-load operation of the rotary electric machine 1.

(Third Magnetic Saturation Portion)

A third magnetic saturation portion 73 is formed in the third magnet accommodating hole 53 at a position facing at least one of the inner surface 631 and the outer surface 632 of the third permanent magnet 63. In the present embodiment, the third magnetic saturation portion 73 is formed at a position facing the inner surface 631 of the third permanent magnet 63. When viewed in the axial direction, the third magnetic saturation portion 73 extends to face a facing surface of the third permanent magnet 63 facing the third magnetic saturation portion 73, that is, the inner surface 631 of the third permanent magnet 63 in the present embodiment.

The third magnetic saturation portion 73 includes a plurality of protrusions 73a in which a part of the rotor core 20 protrudes from the inner wall portion 531 of the third magnet accommodating hole 53 toward the inner surface 631 of the third permanent magnet 63 and which are formed along an extending direction of the third magnetic saturation portion 73, and a plurality of voids 73h formed between the adjacent protrusions 73a along the extending direction of the third magnetic saturation portion 73.

In the present embodiment, the protrusion 73a protrudes from the inner wall portion 531 of the third magnet accommodating hole 53 toward the inner surface 631 of the third permanent magnet 63 by being curved in a wave shape in the circumferential direction.

In this way, the third magnetic saturation portion 73 is formed inside the wall portion 530 of the third magnet accommodating hole 53 when viewed in the axial direction. When viewed in the axial direction, the third magnetic saturation portion 73 protrudes from the inner wall portion 531 of the third magnet accommodating hole 53 toward the third permanent magnet 63, and extends to face the inner surface 631 of the third permanent magnet. The third magnetic saturation portion 73 includes the protrusions 73a formed by a part of the rotor core 20, and the voids 73b formed between the inner wall portion 531 of the third magnet accommodating hole 53 and the inner surface 631 of the third permanent magnet 63.

The third magnetic saturation portion 73 is formed so as to be magnetically saturated during the no-load operation of the rotary electric machine 1. Magnetic saturation refers to a state in which a magnetic flux density of a magnetic field generated in a magnetization direction of the third permanent magnet 63 is close to a saturation magnetic flux density of the third magnetic saturation portion 73, and in the third magnetic saturation portion 73, a magnetic permeability, that is, a slope of the B-H curve in which the vertical axis represents the magnetic flux density B and the horizontal axis represents the magnetic field H illustrated in FIG. 11 starts to decrease.

As described above, the rotor core 20 is formed by laminating the plurality of electromagnetic steel sheets 40 having the substantially annular shape centered on the rotation axis RC in the axial direction. However, since a relative permeability of the voids 73b is lower than that of the electromagnetic steel sheets 40, the saturation magnetic flux density of the third magnetic saturation portion 73 is lower than that of a portion of the rotor core 20 in which the electromagnetic steel sheets 40 are laminated in the axial direction without forming the voids.

Therefore, as illustrated in FIGS. 3A and 3B, the third magnetic saturation portion 73 is more likely to be magnetically saturated than the portion in which the electromagnetic steel sheets 40 are laminated in the axial direction without forming the voids. Therefore, during no-load operation of the rotary electric machine 1, the third magnetic saturation portion 73 can be formed to be magnetically saturated while the second q-axis magnetic path 32q of the rotor core 20 is not magnetically saturated.

Since the third magnetic saturation portion 73 is formed so as to be magnetically saturated during the no-load operation of the rotary electric machine 1, the third magnetic saturation portion 73 is magnetically saturated by a magnetic flux generated from the third permanent magnet 63 during the no-load operation of the rotary electric machine 1, a magnetic resistance of the third magnetic saturation portion 73 increases, and the magnetic flux generated in the magnetization direction of the third permanent magnet 63 decreases as compared with a case where the third magnetic saturation portion 73 is not formed.

Since the iron loss is dominant in the loss occurring in the rotary electric machine 1 during the no-load operation of the rotary electric machine 1, the loss occurring in the rotary electric machine 1 during the no-load operation of the rotary electric machine 1 can be reduced by the third magnetic saturation portion 73.

On the other hand, as illustrated in FIGS. 4A and 4B, during the high-load operation of the rotary electric machine 1, a large current is supplied to the stator coil 92, and a large magnetic field is generated from the stator 90. At this time, a magnetic flux generated in the magnetization direction of the third permanent magnet 63 is offset by a d-axis inter-linkage magnetic flux generated by a negative d-axis current flowing through the stator coil 92, and thus is reduced as compared with the case of the no-load operation of the rotary electric machine 1. Therefore, even if the third magnetic saturation portion 73 is formed such that the magnetic saturation occurs during the no-load operation of the rotary electric machine 1, magnetic saturation can be prevented from occurring in the third magnetic saturation portion 73 during the high-load operation of the rotary electric machine 1. Therefore, even if the third magnetic saturation portion 73 is formed, the magnetic flux generated in the magnetization direction of the third permanent magnet 63 during the high-load operation of the rotary electric machine 1 is substantially the same as that in the case where the third magnetic saturation portion 73 is not formed, and the rotary electric machine 1 can suppress a decrease in the maximum output torque during the high-load operation.

In this way, in the rotor 10 for the rotary electric machine 1, since the third magnetic saturation portion 73 is formed in the third magnet accommodating hole 53, it is possible to reduce the loss occurring in the rotary electric machine 1 during the no-load operation and the low-load operation of the rotary electric machine 1 while suppressing the decrease in the maximum output torque during the high-load operation of the rotary electric machine 1. Since the third magnetic saturation portion 73 includes the protrusions 73a formed by a part of the rotor core 20, and the voids 73b formed between the inner wall portion 531 of the third magnet accommodating hole 53 and the third permanent magnet 63, the third magnetic saturation portion 73 can be easily formed. Since a proportion of the protrusions 73a in the third magnetic saturation portion 73 and a proportion of the voids 73b in the third magnetic saturation portion 73 can be easily adjusted, the saturation magnetic flux density of the third magnetic saturation portion 73 can be easily adjusted.

Since the third magnetic saturation portion 73 includes the protrusions 73a in which a part of the rotor core 20 protrudes from the inner wall portion 531 of the third magnet accommodating hole 53 toward the inner surface 631 of the third permanent magnet 63, and the voids 73b formed between the adjacent protrusions 73a, it is possible to form the third magnetic saturation portion 73 while suppressing an increase in man-hours for manufacturing the rotor 10 by punching the electromagnetic steel sheets 40 into a desired shape.

Returning to FIG. 2, the third magnetic saturation portion 73 includes a main surface 731 extending to face the inner surface 631 of the third permanent magnet 63, and a pair of side surfaces 732 extending from both end portions of the main surface 731 toward the inner wall portion 531 of the third magnet accommodating hole 53 while facing outward in the extending direction of the third magnetic saturation portion 73. The pair of side surfaces 732 are formed so as to be exposed to inside of the third magnet accommodating hole 53.

In the present embodiment, the main surface 731 is formed by distal end surfaces of the plurality of protrusions 73a. The pair of side surfaces 732 are formed by surfaces, facing outward in the extending direction of the third magnetic saturation portion 73, of the protrusions 73a formed at both ends in the extending direction of the third magnetic saturation portion 73.

The third permanent magnet 63 is disposed in the third magnet accommodating hole 53 at a position where both end portions of the inner surface 631 are spaced apart from the wall portion 530 of the third magnet accommodating hole 53 when viewed in the axial direction. In other words, in the third magnet accommodating hole 53, the third permanent magnet 63 is disposed at a position where both end portions of the inner surface 631 do not come into contact with any of the inner wall portion 531, the outer wall portion 532, the d-axis side wall portion 533d, and the q-axis side wall portion 533q of the third magnet accommodating hole 53 when viewed in the axial direction.

Therefore, the third magnetic saturation portion 73 is disposed in the flux barrier region 33 including the first magnet accommodating hole 51, the second magnet accommodating hole 52, and the third magnet accommodating hole 53. In this way, the third magnetic saturation portion 73 is formed at a position avoiding the first q-axis magnetic path 31q and the second q-axis magnetic path 32q.

Accordingly, since the third magnetic saturation portion 73 is disposed at a position where the q-axis interlinkage magnetic flux generated by the q-axis current flowing through the stator coil 92 is not reduced, it is possible to provide the third magnetic saturation portion 73 while suppressing the decrease in the maximum output torque during the high-load operation of the rotary electric machine 1.

<Maximum Output Torque-No-Load Loss Characteristics>

Next, torque-no-load loss characteristics of the rotary electric machine 1 in a case where the first magnetic saturation portion 71, the second magnetic saturation portion 72, and the third magnetic saturation portion 73 are formed will be described with reference to FIG. 5.

Figure 5:
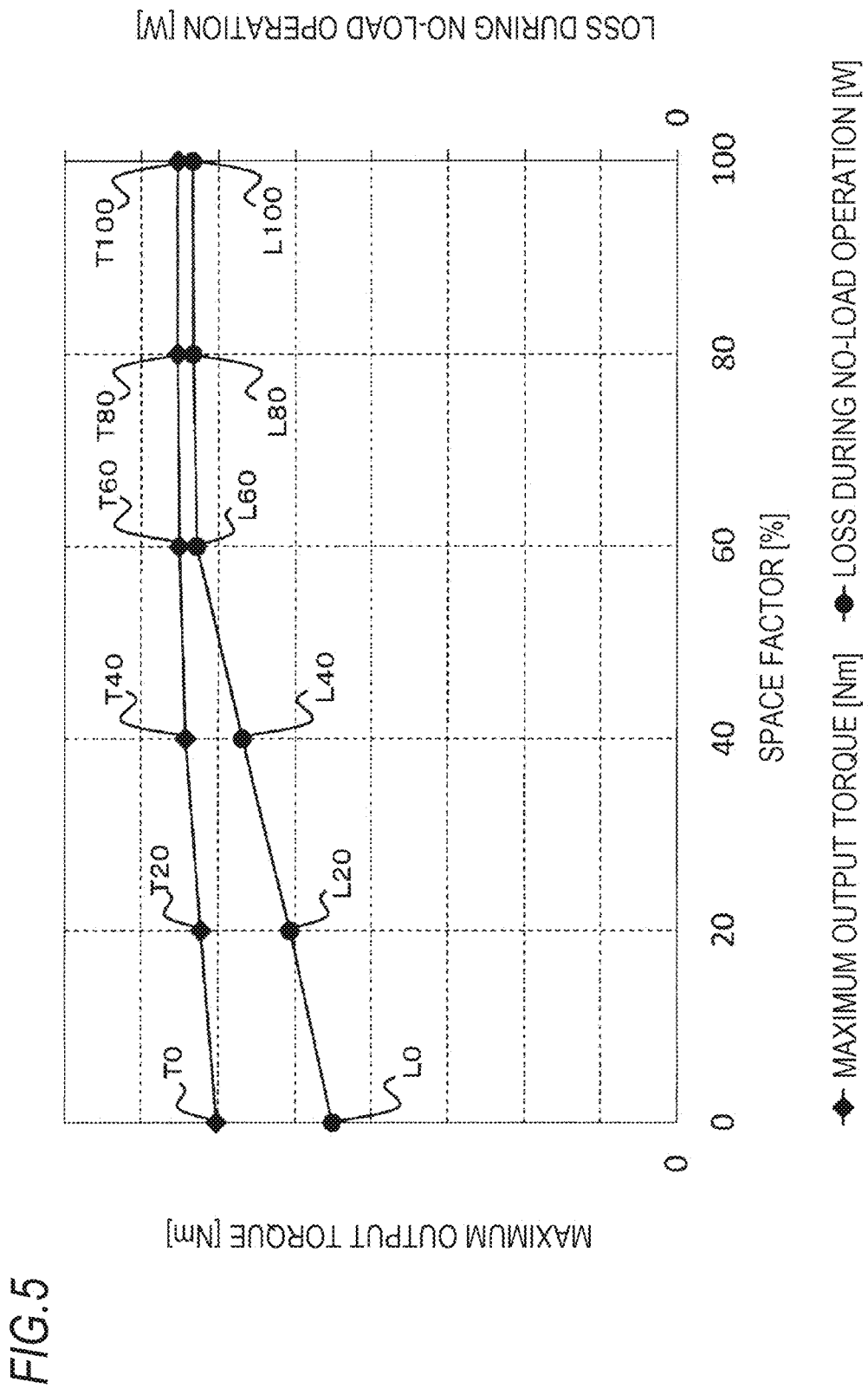
FIG. 5 is a graph illustrating maximum output torque-loss during no-load operation characteristics of the rotary electric machine when a space factor of each of the first magnetic saturation portion, the second magnetic saturation portion, and the third magnetic saturation portion of the rotor for the rotary electric machine according to the first embodiment in FIG. 1 is changed.

FIG. 5 is a graph illustrating maximum output torque-no-load loss characteristics in a case where a proportion of the protrusions 71a, 72a, 73a formed by a part of the rotor core 20 respectively in the first magnetic saturation portion 71, the second magnetic saturation portion 72, and the third magnetic saturation portion 73 is changed. In the present specification and the like, the proportion of the protrusions 71a, 72a, 73a respectively in the first magnetic saturation portion 71, the second magnetic saturation portion 72, and the third magnetic saturation portion 73 may be referred to as a space factor.

A maximum output torque TO illustrated in FIG. 5 is the maximum output torque of the rotary electric machine 1 in a case where the space factor is 0%, that is, the entire region where the first magnetic saturation portion 71, the second magnetic saturation portion 72, and the third magnetic saturation portion 73 are provided is a void.

A maximum output torque T20 is the maximum output torque of the rotary electric machine 1 in a case where the space factor is 20%, that is, a proportion of the protrusions 71a, 72a, 73a formed by a part of the rotor core 20 respectively in the first magnetic saturation portion 71, the second magnetic saturation portion 72, and the third magnetic saturation portion 73 is 20%.

A maximum output torque T40 is the maximum output torque of the rotary electric machine 1 in a case where the space factor is 40%, that is, a proportion of the protrusions 71a, 72a, 73a formed by a part of the rotor core 20 respectively in the first magnetic saturation portion 71, the second magnetic saturation portion 72, and the third magnetic saturation portion 73 is 40%.

A maximum output torque T60 is the maximum output torque of the rotary electric machine 1 in a case where the space factor is 60%, that is, a proportion of the protrusions 71a, 72a, 73a formed by a part of the rotor core 20 respectively in the first magnetic saturation portion 71, the second magnetic saturation portion 72, and the third magnetic saturation portion 73 is 60%.

A maximum output torque T80 is the maximum output torque of the rotary electric machine 1 in a case where the space factor is 80%, that is, a proportion of the protrusions 71a, 72a, 73a formed by a part of the rotor core 20 respectively in the first magnetic saturation portion 71, the second magnetic saturation portion 72, and the third magnetic saturation portion 73 is 80%.

A maximum output torque T100 is the maximum output torque of the rotary electric machine 1 in a case where the space factor is 100%, that is, the entire region where the first magnetic saturation portion 71, the second magnetic saturation portion 72, and the third magnetic saturation portion 73 are provided is the rotor core 20.

A no-load loss L0 illustrated in FIG. 5 is a loss which occurs during the no-load operation of the rotary electric machine 1 in the case where the space factor is 0%, that is, the entire region where the first magnetic saturation portion 71, the second magnetic saturation portion 72, and the third magnetic saturation portion 73 are provided is the void.

A no-load loss L20 is a loss which occurs during the no-load operation of the rotary electric machine 1 in the case where the space factor is 20%, that is, the proportion of the protrusions 71a, 72a, 73a formed by a part of the rotor core 20 respectively in the first magnetic saturation portion 71, the second magnetic saturation portion 72, and the third magnetic saturation portion 73 is 20%.

A no-load loss L40 is a loss which occurs during the no-load operation of the rotary electric machine 1 when the space factor is 40%, that is, the proportion of the protrusions 71a, 72a, 73a formed by a part of the rotor core 20 respectively in the first magnetic saturation portion 71, the second magnetic saturation portion 72, and the third magnetic saturation portion 73 is 40%.

A no-load loss L60 is a loss which occurs during the no-load operation of the rotary electric machine 1 in a case where the space factor is 60%, that is, the proportion of the protrusions 71a, 72a, 73a formed by a part of the rotor core 20 respectively in the first magnetic saturation portion 71, the second magnetic saturation portion 72, and the third magnetic saturation portion 73 is 60%.

A no-load loss L80 is a loss which occurs during the no-load operation of the rotary electric machine 1 in a case where the space factor is 80%, that is, the proportion of the protrusions 71a, 72a, 73a formed by a part of the rotor core 20 respectively in the first magnetic saturation portion 71, the second magnetic saturation portion 72, and the third magnetic saturation portion 73 is 80%.

A no-load loss L100 is a loss which occurs during the no-load operation of the rotary electric machine 1 in the case where the space factor is 100%, that is, the entire region where the first magnetic saturation portion 71, the second magnetic saturation portion 72, and the third magnetic saturation portion 73 are provided is the rotor core 20.

In the present embodiment, the space factor of each of the first magnetic saturation portion 71, the second magnetic saturation portion 72, and the third magnetic saturation portion 73 is 20% or higher and 60% or lower, that is, the proportion of each of the protrusions 71a, 72a, 73a formed by a part of the rotor core 20 is 20% or higher and 60% or lower. More preferably, the space factor of each of the first magnetic saturation portion 71, the second magnetic saturation portion 72, and the third magnetic saturation portion 73 is in the vicinity of 40%, that is, the proportion of each of the protrusions 71a, 72a, 73a formed by a part of the rotor core 20 is in the vicinity of 40%.

Accordingly, as illustrated in FIG. 5, it is possible to further suppress the decrease in the maximum output torque of the rotary electric machine 1 and to further reduce the loss during the no-load operation of the rotary electric machine 1.

(Modification)

Figure 6:
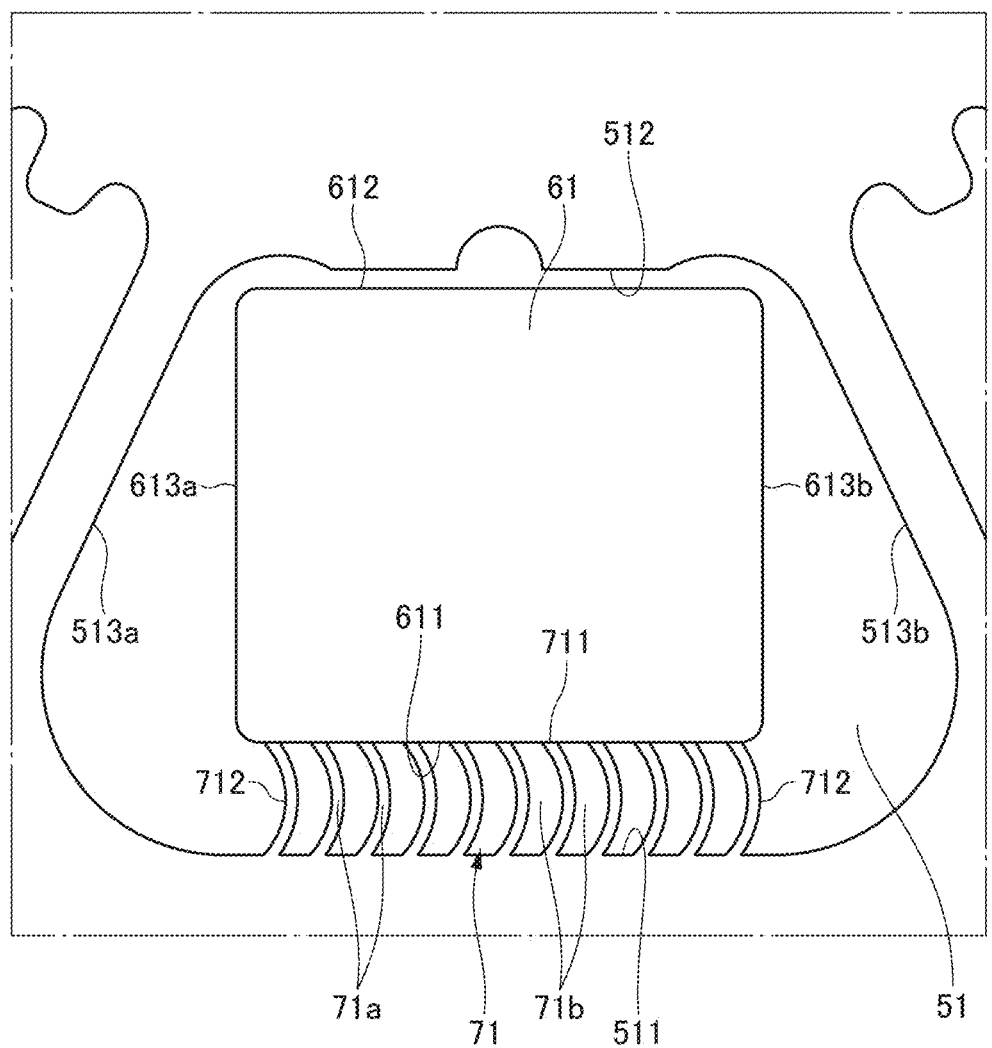
FIG. 6 is a view illustrating a modification of the first magnetic saturation portion of the rotor for the rotary electric machine according to a first embodiment of the present disclosure.

As illustrated in FIG. 6, the first magnetic saturation portion 71 may be formed such that the protrusion 71a protrudes from the inner wall portion 511 of the first magnet accommodating hole 51 toward the inner surface 611 of the first permanent magnet 61 by being curved in an arc shape convex toward one end side in the extending direction of the first magnetic saturation portion 71. Although detailed description is omitted, similarly to the first magnetic saturation portion 71, the second magnetic saturation portion 72 and the third magnetic saturation portion 73 may also be formed such that the protrusion 72a protrudes from the inner wall portion 521 of the second magnet accommodating hole 52 toward the inner surface 621 of the second permanent magnet 62 by being curved in an arc shape convex toward one end side in the extending direction of the second magnetic saturation portion 72, and the protrusion 73a protrudes from the inner wall portion 531 of the third magnet accommodating hole 53 toward the inner surface 631 of the third permanent magnet 63 by being curved in a convex arc shape convex toward one end side in the extending direction of the third magnetic saturation portion 73.

Second Embodiment

Next, the rotor 10 for a rotary electric machine according to a second embodiment of the present disclosure will be described with reference to FIGS. 7 to 9. In the following description, the same components as those of the rotor 10 for the rotary electric machine according to the first embodiment are denoted by the same reference numerals, and description thereof will be omitted or simplified. The rotor 10 for the rotary electric machine according to the second embodiment is different from the rotor 10 for the rotary electric machine according to the first embodiment in shapes of the first magnetic saturation portion 71, the second magnetic saturation portion 72, and the third magnetic saturation portion 73. Hereinafter, a shape of the first magnetic saturation portion 71 in the rotor 10 for the rotary electric machine according to the second embodiment will be described in detail. Although detailed description is omitted, the second magnetic saturation portion 72 and the third magnetic saturation portion 73 in the rotor 10 for the rotary electric machine according to the second embodiment each have a shape the same as that of the first magnetic saturation portion 71 in the rotor 10 for the rotary electric machine according to the second embodiment.

Figure 7:
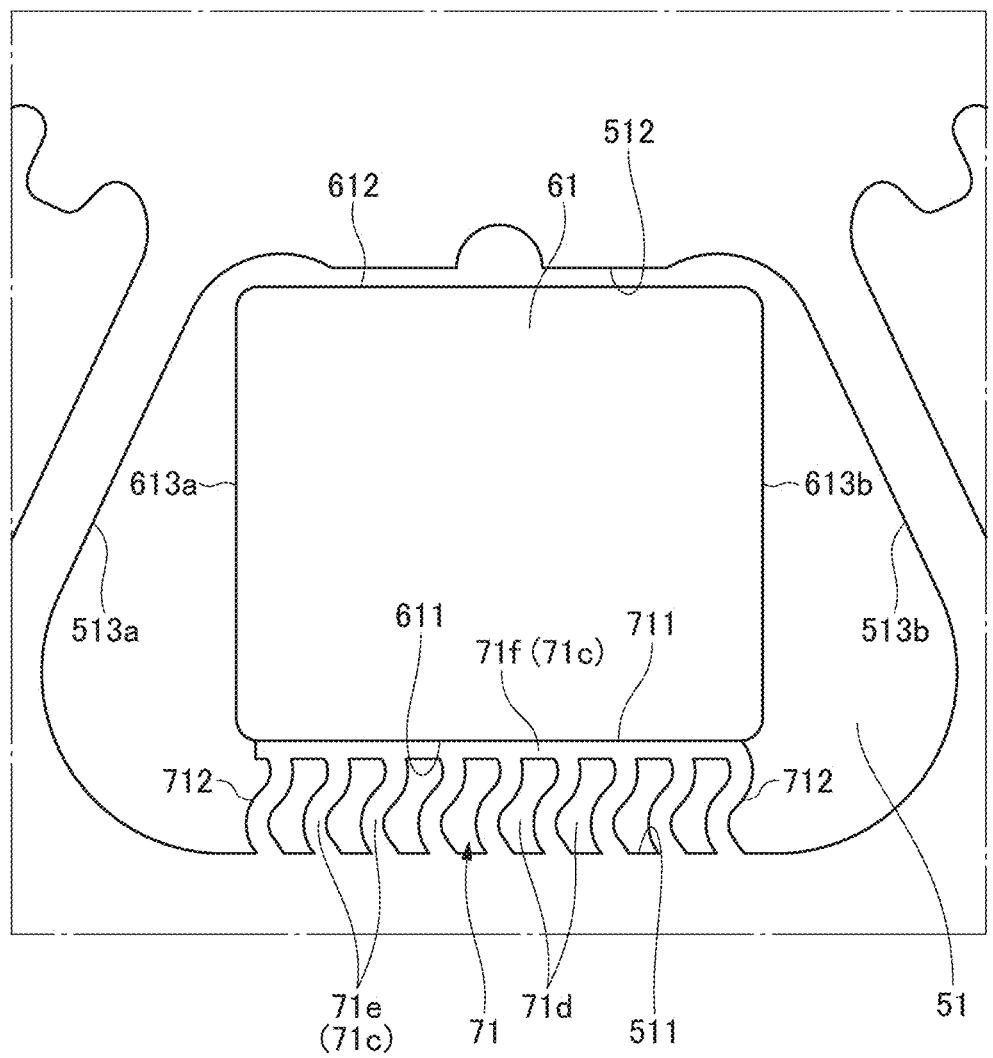
FIG. 7 is a view illustrating a first example of a first magnetic saturation portion of a rotor for a rotary electric machine according to a second embodiment of the present disclosure.
Figure 8:
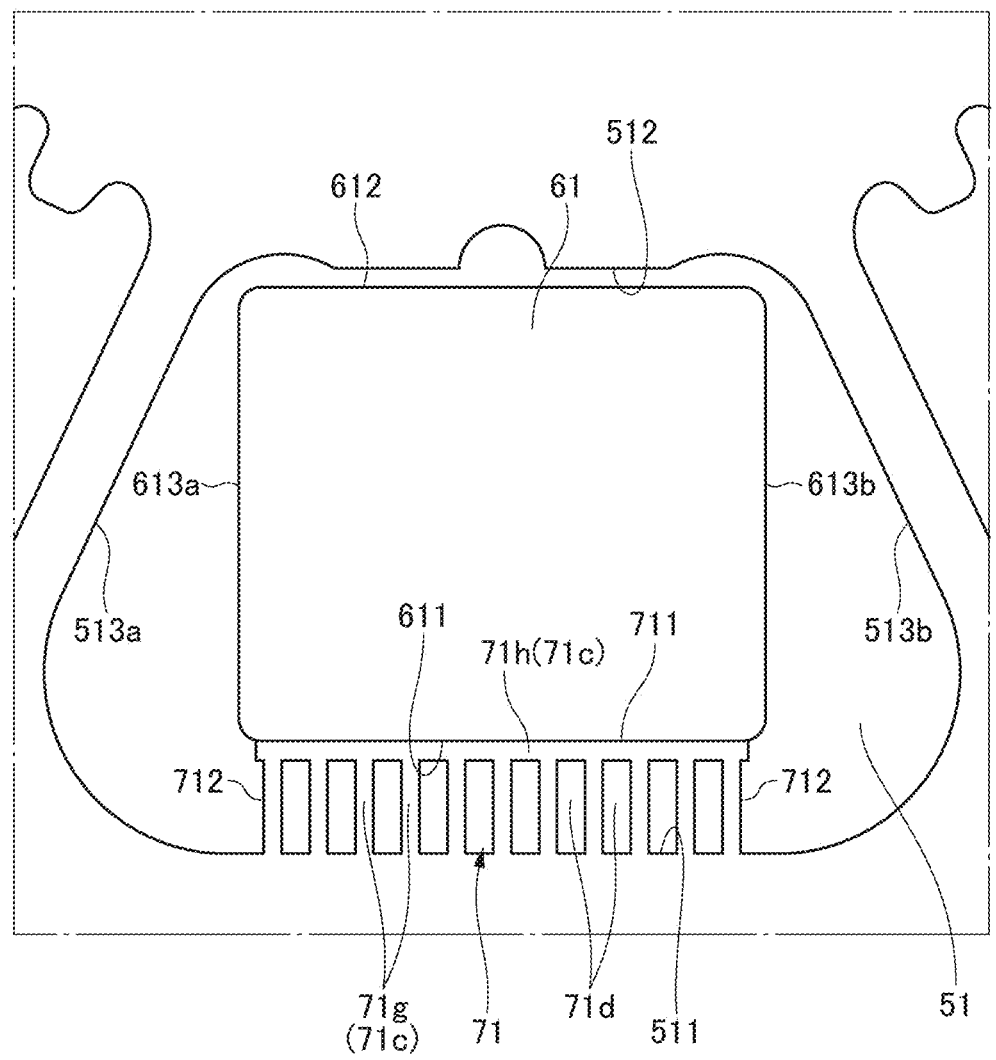
FIG. 8 is a view illustrating a second example of the first magnetic saturation portion of the rotor for the rotary electric machine according to the second embodiment of the present disclosure.
Figure 9:
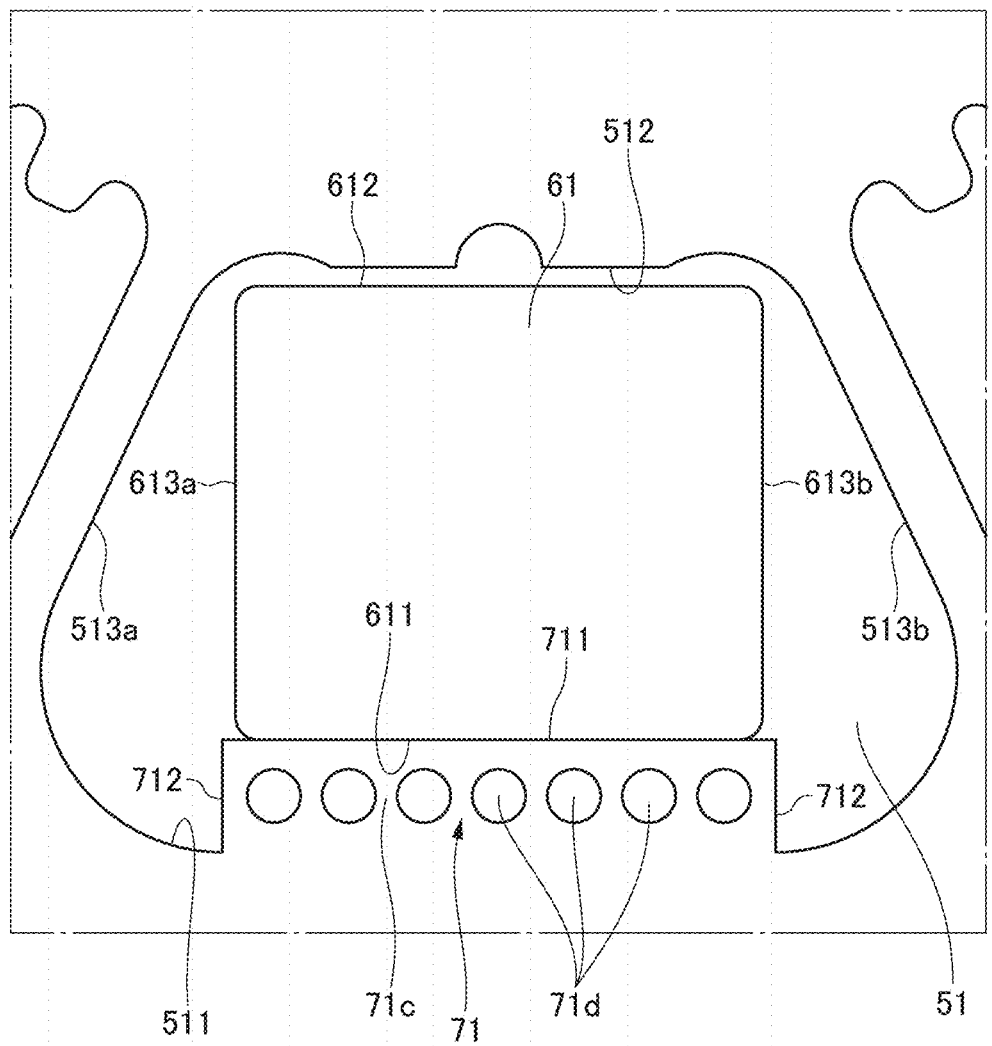
FIG. 9 is a view illustrating a third example of the first magnetic saturation portion of the rotor for the rotary electric machine according to the second embodiment of the present disclosure.

As illustrated in FIGS. 7 to 9, when viewed in the axial direction, the first magnetic saturation portion 71 according to the present embodiment includes a protruding portion 71c in which a part of the rotor core 20 protrudes from the inner wall portion 511 of the first magnet accommodating hole 51 toward the inner surface 611 of the first permanent magnet 61, and a plurality of voids 71d formed inside the protruding portion 71c along the extending direction of the first magnetic saturation portion 71.

(First Example)

As illustrated in FIG. 7, when viewed in the axial direction, the protruding portion 71c of the first magnetic saturation portion 71 according to a first example of the present embodiment includes a plurality of protrusions 71e in which a part of the rotor core 20 protrudes from the inner wall portion 511 of the first magnet accommodating hole 51 toward the inner surface 611 of the first permanent magnet 61 and which are formed along the extending direction of the first magnetic saturation portion 71, and a main surface portion 71f connecting distal end portions of the protrusions 71e and extending to face the inner surface 611 of the first permanent magnet 61. The protrusion 71e protrudes from the inner wall portion 511 of the first magnet accommodating hole 51 toward the inner surface 611 of the first permanent magnet 61 by being curved in a wave shape in the circumferential direction.

In the present example, the main surface 711 is formed by the main surface portion 71f. The pair of side surfaces 712 are formed by surfaces, facing outward in the extending direction of the first magnetic saturation portion 71, of the protrusions 71e formed at both ends in the extending direction of the first magnetic saturation portion 71.

In the present example, the void 71d is surrounded by two adjacent protrusions 71e, the main surface portion 71f, and the inner wall portion 511 of the first magnet accommodating hole 51, and a plurality of voids 71d are formed inside the protruding portion 71c.

(Second Example)

As illustrated in FIG. 8, when viewed in the axial direction, the protruding portion 71c of the first magnetic saturation portion 71 according to a second example of the present embodiment includes a plurality of protrusions 71g in which a part of the rotor core 20 protrudes from the inner wall portion 511 of the first magnet accommodating hole 51 toward the inner surface 611 of the first permanent magnet 61 and which are formed along the extending direction of the first magnetic saturation portion 71, and a main surface portion 71h connecting distal end portions of the protrusions 71g and extending to face the inner surface 611 of the first permanent magnet 61. The protrusion 71g protrudes substantially linearly from the inner wall portion 511 of the first magnet accommodating hole 51 in a direction substantially orthogonal to the inner surface 611 of the first permanent magnet 61.

In the present example, the main surface 711 is formed by the main surface portion 71h. The pair of side surfaces 712 are formed by surfaces, facing outward in the extending direction of the first magnetic saturation portion 71, of the protrusions 71g firmed at both ends in the extending direction of the first magnetic saturation portion 71.

In the present example, the void 71d is surrounded by two adjacent protrusions 71g, the main surface portion 71h, and the inner wall portion 511 of the first magnet accommodating hole 51, and a plurality of voids 71d are formed inside the protruding portion 71c.

(Third Example)

As illustrated in FIG. 9, the protruding portion 71c of the first magnetic saturation portion 71 according to a third example of the present embodiment has a substantially rectangular shape in which a part of the rotor core 20 protrudes from the inner wall portion 511 of the first magnet accommodating hole 51 toward the inner surface 611 of the first permanent magnet 61 and whose longitudinal direction is the extending direction of the first magnetic saturation portion 71 when viewed in the axial direction.

In the present example, the main surface 711 is formed by a distal end surface of the protruding portion 71c facing the inner surface 611 of the first permanent magnet 61, the protruding portion 71c having a substantially rectangular shape when viewed in the axial direction. The pair of side surfaces 712 are formed by side wall surfaces formed at both ends in the extending direction of the first magnetic saturation portion 71 when viewed in the axial direction.

In the present example, the void 71d has a substantially circular shape when viewed in the axial direction, and a plurality of voids 71d are formed inside the protruding portion 71c along the extending direction of the first magnetic saturation portion 71.

As described in the first example to the third example, since the first magnetic saturation portion 71 according to the present embodiment includes the protruding portion 71c in which a part of the rotor core 20 protrudes from the inner wall portion 511 of the first magnet accommodating hole 51 toward the inner surface 611 of the first permanent magnet 61, and the plurality of voids 71d formed inside the protruding portion 71c along the extending direction of the first magnetic saturation portion 71, it is possible to form the first magnetic saturation portion 71 while suppressing an increase in man-hours for manufacturing the rotor 10 by punching the electromagnetic steel sheets 40 into a desired shape.

Since the voids 71d is formed inside the protruding portion 71c, the first magnetic saturation portion 71 can be formed with high rigidity.

Third Embodiment

Next, the rotor 10 for a rotary electric machine according to a third embodiment of the present disclosure will be described with reference to FIG. 10. In the following description, the same components as those of the rotor 10 for the rotary electric machine according to the first embodiment are denoted by the same reference numerals, and description thereof will be omitted or simplified. The rotor 10 for the rotary electric machine according to the third embodiment is different from the rotor 10 for the rotary electric machine according to the first embodiment in arrangement and shapes of the first magnet accommodating hole 51, the second magnet accommodating hole 52, and the third magnet accommodating hole 53, and arrangement and shapes of the first permanent magnet 61, the second permanent magnet 62, and the third permanent magnet 63. Hereinafter, differences between the rotor 10 for the rotary electric machine according to the first embodiment and the rotor 10 for the rotary electric machine according to the third embodiment will be described in detail.

Figure 10:
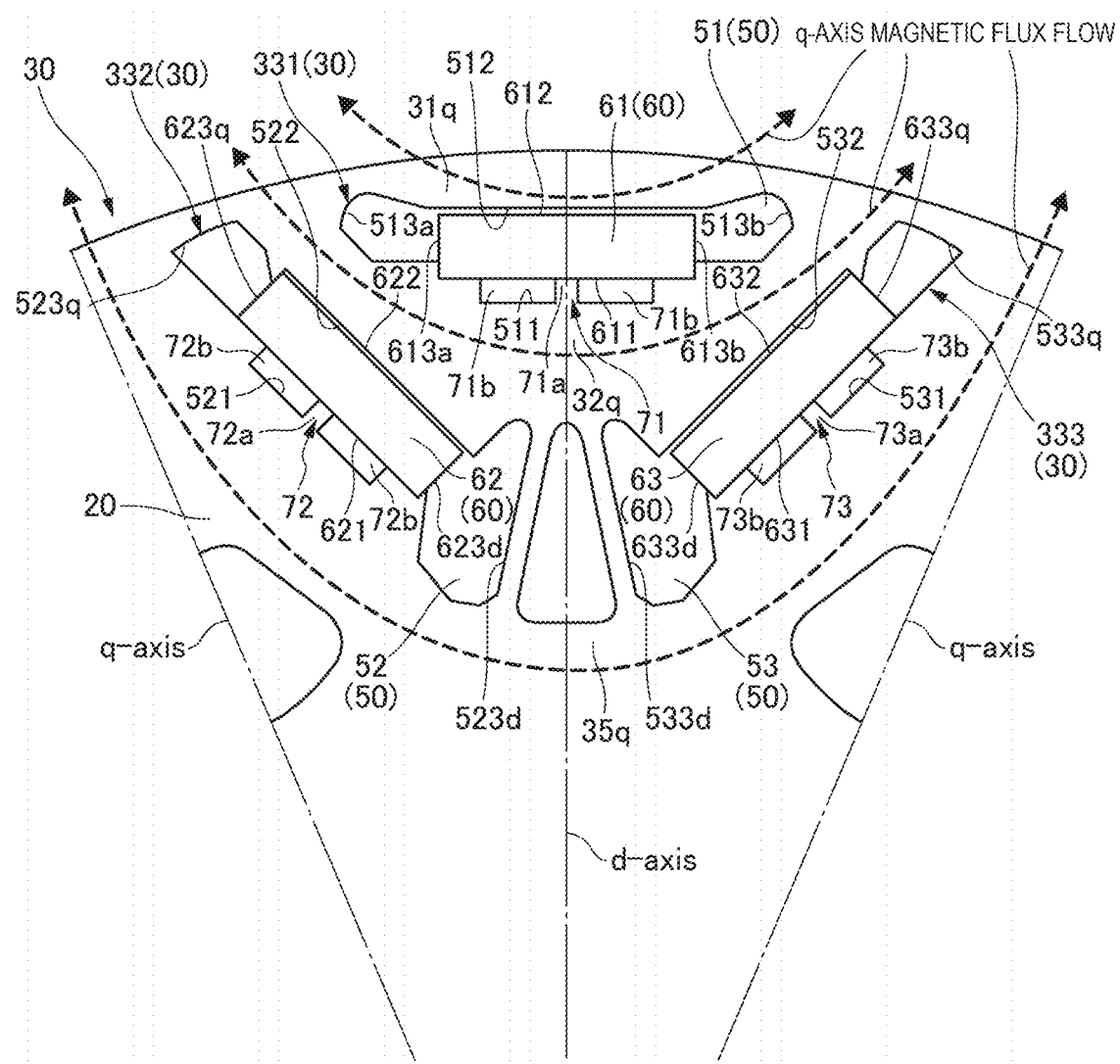
FIG. 10 is a front view of a magnetic pole portion of a rotor for a rotary electric machine according to a third embodiment of the present disclosure.

As illustrated in FIG. 10, in the present embodiment, the first magnet accommodating holes 51 is formed in the vicinity of an outer peripheral surface of the rotor core 20. The second magnet accommodating hole 52 is formed such that the d-axis side end surface 623d of the second permanent magnet 62 is positioned radially inward of the first permanent magnet 61, and the q-axis side end surface 623q of the second permanent magnet 62 is positioned at a position substantially the same as that of the first permanent magnet 61 in a radial direction. The third magnet accommodating hole 53 is formed such that the d-axis side end surface 633d of the third permanent magnet 63 is positioned radially inward of the first permanent magnet 61, and the q-axis side end surface 633q of the third permanent magnet 63 is positioned at a position substantially the same as that of the first permanent magnet 61 in the radial direction.

In the present embodiment, in the magnetic pole portion 30, the first q-axis magnetic path 31q through which a q-axis interlinkage magnetic flux generated by a q-axis current flowing through the stator coil 92 passes is formed radially outward of the first magnet accommodating hole 51. In the magnetic pole portion 30, the second q-axis magnetic path 32q through which a q-axis interlinkage magnetic flux generated by a q-axis current flowing through the stator coil 92 passes is formed in a region radially inward of the first magnet accommodating hole 51 and radially outward of the second magnet accommodating hole 52 and the third magnet accommodating hole 53. A third q-axis magnetic path 35q through which a q-axis interlinkage magnetic flux generated by a q-axis current flowing through the stator coil 92 passes is formed radially inward of the second magnet accommodating hole 52 and the third magnet accommodating hole 53.

The q-axis interlinkage magnetic flux passes through the first q-axis magnetic path 31q while being curved in a convex shape convex radially inward along the outer wall portion 512 of the first magnet accommodating hole 51. The q-axis interlinkage magnetic flux passes through the second q-axis magnetic path 32q while being curved in a convex shape convex radially inward along the inner wall portion 511 of the first magnet accommodating hole 51, the outer wall portion 522 of the second magnet accommodating hole 52, and the outer wall portion 532 of the third magnet accommodating hole 53. The q-axis interlinkage magnetic flux passes through the third q-axis magnetic path 35q while being curved in a convex shape convex radially inward along the inner wall portion 521 of the second magnet accommodating hole 52 and the inner wall portion 531 of the third magnet accommodating hole 53.

The flux barrier region 33 formed in the magnetic pole portion 30 includes a first flux barrier region 331 formed between the first q-axis magnetic path 31q and the second q-axis magnetic path 32q, and a second flux barrier region 332 formed between the second q-axis magnetic path 32q and the third q-axis magnetic path 35q. The first flux barrier region 331 is a region which includes the first magnet accommodating hole 51 and is curved in a convex shape convex radially inward along the first q-axis magnetic path 31q and the second q-axis magnetic path 32q. The second flux barrier region 332 is a region which includes the second magnet accommodating hole 52 and the third magnet accommodating hole 53 and is curved in a convex shape convex radially inward along the second q-axis magnetic path 32q and the third q-axis magnetic path 35q. The first flux barrier region 331 and the second flux barrier region 332 are preferably formed such that the q-axis magnetic flux does not pass therethrough as much as possible.

The first magnetic saturation portion 71 includes the protrusion 71a at a substantially central portion in an extending direction of the inner wall portion. 511 of the first magnet accommodating hole 51, in which a part of the rotor core 20 protrudes from the inner wall portion 511 of the first magnet accommodating hole 51 toward the inner surface 611 of the first permanent magnet 61, and a pair of voids 71b formed with the protrusion 71a interposed therebetween. In other words, the pair of voids 71b are formed on one side and the other side of the protrusion 71a in the extending direction of the inner wall portion 511 of the first magnet accommodating hole 51.

The second magnetic saturation portion 72 includes the protrusion 72a at a substantially central portion in an extending direction of the inner wall portion 521 of the second magnet accommodating hole 52, in which a part of the rotor core 20 protrudes from the inner wall portion 521 of the second magnet accommodating hole 52 toward the inner surface 621 of the second permanent magnet 62, and a pair of voids 72b formed with the protrusion 72a interposed therebetween. In other words, the pair of voids 72b are formed on one side and the other side of the protrusion 72a in the extending direction of the inner wall portion 521 of the second magnet accommodating hole 52.

The third magnetic saturation portion 73 includes the protrusion 73a at a substantially central portion in an extending direction of the inner wall portion 531 of the third magnet accommodating hole 53, in which a part of the rotor core 20 protrudes from the inner wall portion 531 of the third magnet accommodating hole 53 toward the inner surface 631 of the third permanent magnet 63, and a pair of voids 73h formed with the protrusion 73a interposed therebetween. In other words, the pair of voids 73b are formed on one side and the other side of the protrusion 73a in the extending direction of the inner wall portion 531 of the third magnet accommodating hole 53.

Accordingly, since the first magnetic saturation portion 71, the second magnetic saturation portion 72, and the third magnetic saturation portion 73 can be formed to have a simple shape, the first magnetic saturation portion 71, the second magnetic saturation portion 72, and the third magnetic saturation portion 73 can be easily manufactured.

Although the embodiments of the present disclosure have been described above with reference to the accompanying drawings, it is needless to say that the present disclosure is not limited to the embodiments. It will be apparent to those skilled in the art that various changes and modifications may be conceived within the scope of the claims, it is also understood that the various changes and modifications belong to the technical scope of the present disclosure. In addition, components in the embodiments described above may be combined freely in a range without deviating from the spirit of the disclosure.

For example, the inside of the first magnet accommodating hole 51 including the void 71b of the first magnetic saturation portion 71 may be filled with resin. Similarly, the inside of the second magnet accommodating hole 52 including the void 72b of the second magnetic saturation portion 72 may be filled with resin. Similarly, the inside of the third magnet accommodating hole 53 including the void 73b of the third magnetic saturation portion 73 may be filled with resin.

For example, in the present embodiment, the first magnetic saturation portion 71 is formed on the inner wall portion 511 of the first magnet accommodating hole 51, but the first magnetic saturation portion 71 may be formed on the outer wall portion 512 of the first magnet accommodating hole 51, or may be formed on both the inner wall portion 511 and the outer wall portion 512 of the first magnet accommodating hole 51.

For example, in the present embodiment, the second magnetic saturation portion 72 is formed on the inner wall portion 521 of the second magnet accommodating hole 52, but the second magnetic saturation portion 72 may be formed on the outer wall portion 522 of the second magnet accommodating hole 52, or may be formed on both the inner wall portion 521 and the outer wall portion 522 of the second magnet accommodating hole 52.

For example, in the present embodiment, the third magnetic saturation portion 73 is formed on the inner wall portion 531 of the third magnet accommodating hole 53, but the third magnetic saturation portion 73 may be formed on the outer wall portion 532 of the third magnet accommodating hole 53, or may be formed on both the inner wall portion 531 and the outer wall portion 532 of the third magnet accommodating hole 53.

For example, in the present embodiment, the rotor 10 for the rotary electric machine includes the first magnetic saturation portion 71 formed in the first magnet accommodating hole 51, the second magnetic saturation portion 72 formed in the second magnet accommodating hole 52, and the third magnetic saturation portion 73 formed in the third magnet accommodating hole 53, but the rotor 10 for the rotary electric machine may include at least one of the first magnetic saturation portion 71, the second magnetic saturation portion 72, and the third magnetic saturation portion 73. That is, any one or two of the first magnetic saturation portion 71, the second magnetic saturation portion 72, and the third magnetic saturation portion 73 may be omitted.

In the present specification, at least the following matters are described. Corresponding components and the like in the embodiments described above are shown as an example in parentheses, but the present disclosure is not limited thereto.

(1) A rotor (rotor 10) for a rotary electric machine (rotary electric machine 1) including:
  a rotor core (rotor core 20) having a substantially annular shape centered on a rotation axis (rotation axis RC); and
  a plurality of magnetic pole portions (magnetic pole portions 30) formed in the rotor core along a circumferential direction, in which:
  each of the magnetic pole portions including a magnet accommodating hole (first magnet accommodating hole 51, second magnet accommodating hole 52, third magnet accommodating hole 53) formed in the rotor core and extending in an axial direction, and a permanent magnet (first permanent magnet 61, second permanent magnet 62, third permanent magnet 63) accommodated in the magnet accommodating hole;
  the permanent magnet includes a first main surface (inner surfaces 611, 621, 631) extending in the axial direction and a second main surface (outer surfaces 612, 622, 632) extending in the axial direction;
  the magnet accommodating hole includes a wall portion (wall portions 510, 520, 530) which forms a contour of the magnet accommodating hole when viewed in the axial direction;
  a saturation portion (first magnetic saturation portion 71, second magnetic saturation portion 72, third magnetic saturation portion 73) which is magnetically saturated during no-load operation of the rotary electric machine is formed in the rotor core at a position facing at least one of the first main surface and the second main surface of the permanent magnet when viewed in the axial direction; and
  when viewed in the axial direction, the saturation portion includes:
    at least one core protrusion (protrusions 71a, 72a, 73a, protruding portion 71c) formed between the wall portion of the magnet accommodating hole and at least one of the first main surface and the second main surface of the permanent magnet such that a part of the rotor core extends in a direction intersecting the first main surface or the second main surface; and
    at least one nonmagnetic portion (voids 71b, 72b, 73b, 71d) formed between the wall portion of the magnet accommodating hole and at least one of the first main surface and the second main surface of the permanent magnet.

According to (1), in the rotor for the rotary electric machine, since the saturation portion includes the core protrusion and the non-magnetic portion formed between the wall portion of the magnet accommodating hole and at least one of the first main surface and the second main surface of the permanent magnet when viewed in the axial direction, it is possible to reduce loss occurring in the rotary electric machine during the no-load operation of the rotary electric machine while suppressing a decrease in the maximum output torque during high-load operation of the rotary electric machine. Since the saturation portion includes the core protrusion and the nonmagnetic portion, the saturation portion can be easily formed.

(2) The rotor for the rotary electric machine according to (1), in which when viewed in the axial direction:
  the saturation portion is formed inside the wall portion of the magnet accommodating hole; and
  a q-axis magnetic path (first q-axis magnetic path 31q, second q-axis magnetic path 32q) through which a q-axis interlinkage magnetic flux of the rotary electric machine passes is formed outside the magnet accommodating hole of each of the magnetic pole portions.

According to (2), since the saturation portion is formed inside the magnet accommodating hole, the saturation portion can be provided at a position avoiding the q-axis magnetic path formed outside the magnet accommodating hole of each of the magnetic pole portions, and it is possible to provide the saturation portion while suppressing the decrease in the maximum output torque during the high-load operation of the rotary electric machine.

(3) The rotor for the rotary electric machine according to (1) or (2), in which:
  the at least one core protrusion comprises a plurality of core protrusions (protrusions 71a, 72a, 73a);
  the plurality of core protrusions is formed between the wall portion of the magnet accommodating hole and at least one of the first main surface and the second main surface of the permanent magnet; and
  the at least one nonmagnetic portion (voids 71b, 72b, 73b) is formed between the plurality of core protrusions.

According to (3), since the plurality of core protrusions are formed between the wall portion of the magnet accommodating hole and at least one of the first main surface and the second main surface of the permanent magnet, and the nonmagnetic portions are formed between the plurality of core protrusions, it is possible to form the saturation portion while suppressing an increase in man-hours for manufacturing the rotor.

(4) The rotor for the rotary electric machine according to (1) or (2), in which:
the at least one nonmagnetic portion comprises a plurality of nonmagnetic portions (voids 71d);
when viewed in the axial direction, the saturation portion includes the at least one core protrusion (the protruding portion 71c) and the plurality of the nonmagnetic portions formed in the at least one core protrusion.

According to (4), since the saturation portion includes the core protrusion and the plurality of nonmagnetic portions formed in the core protrusion when viewed in the axial direction, it is possible to form the saturation portion while suppressing an increase in man-hours for manufacturing the rotor. Since the nonmagnetic portions are formed in the core protrusion, the saturation portion can be formed with high rigidity.

(5) The rotor for the rotary electric machine according to (1) or (2), in which:
the at least one nonmagnetic portion comprises a plurality of nonmagnetic portions (voids 71b, 72b, 73b);
when viewed in the axial direction, the saturation portion includes the at least one core protrusion (protrusions 71a, 72a, 73a) and the plurality of nonmagnetic portions formed with the at least one core protrusion interposed therebetween.

According to (5), since the saturation portion includes the core protrusion and a pair of the nonmagnetic portions formed with the core protrusion interposed therebetween when viewed in the axial direction, the saturation portion can be formed to have a simple shape. Accordingly, the saturation portion can be easily manufactured.

(6) The rotor for the rotary electric machine according to any one of (1) to (5), in which:
a proportion of the part of the rotor core in the saturation portion is 20% or higher and 60% or lower.

According to (6), since the proportion of the part of the rotor core in the saturation portion is 20% or higher and 60% or lower, it is possible to further suppress the decrease in the maximum output torque of the rotary electric machine and to further reduce the loss during the no-load operation of the rotary electric machine.

(7) The rotor for the rotary electric machine according to any one of (1) to (6), in which:
when viewed in the axial direction, the saturation portion includes a main surface (main surfaces 711, 721, 731) extending to face at least one of the first main surface and the second main surface of the permanent magnet, and a pair of side surfaces (side surfaces 712, 722, 732) extending from both end portions of the main surface toward the wall portion of the magnet accommodating hole while facing outward in an extending direction of the saturation portion;
the pair of side surfaces are formed so as to be exposed to inside of the magnet accommodating hole; and
the permanent magnet is disposed in the magnet accommodating hole at a position where both end portions of the first main surface or the second main surface of the permanent magnet are spaced apart from the wall portion of the magnet accommodating hole when viewed in the axial direction.

According to (7), the pair of side surfaces of the saturation portion are formed so as to be exposed to the inside of the magnet accommodating hole, and the permanent magnet is disposed in the magnet accommodating hole at the position where both end portions of the facing surface are spaced apart from the wall portion of the magnet accommodating hole when viewed in the axial direction, so that the saturation portion is disposed at a position where the q-axis interlinkage magnetic flux is not reduced. Accordingly, it is possible to provide the saturation portion while suppressing the decrease in the maximum output torque during the high-load operation of the rotary electric machine.

The invention claimed is:

1. A rotor for a rotary electric machine comprising:
a rotor core having a substantially annular shape centered on a rotation axis; and
a plurality of magnetic pole portions formed in the rotor core along a circumferential direction, wherein:
each of the magnetic pole portions includes a magnet accommodating hole formed in the rotor core and extending in an axial direction, and a permanent magnet accommodated in the magnet accommodating hole;
the permanent magnet includes a first main surface extending in the axial direction and a second main surface extending in the axial direction;
the magnet accommodating hole includes a wall portion which forms a contour of the magnet accommodating hole when viewed in the axial direction;
a saturation portion which is magnetically saturated during no-load operation of the rotary electric machine is formed in the rotor core at a position facing at least one of the first main surface and the second main surface of the permanent magnet when viewed in the axial direction;
when viewed in the axial direction, the saturation portion includes:
at least one core protrusion formed between the wall portion of the magnet accommodating hole and at least one of the first main surface and the second main surface of the permanent magnet such that a part of the rotor core extends in a direction intersecting the first main surface or the second main surface; and
at least one nonmagnetic portion formed between the wall portion of the magnet accommodating hole and at least one of the first main surface and the second main surface of the permanent magnet;
the at least one nonmagnetic portion comprises a plurality of nonmagnetic portions; and
when viewed in the axial direction, the saturation portion includes the at least one core protrusion and the plurality of nonmagnetic portions formed in the at least one core protrusion.

2. The rotor for the rotary electric machine according to claim 1, wherein when viewed in the axial direction:
the saturation portion is formed inside the wall portion of the magnet accommodating hole; and
a q-axis magnetic path through which a q-axis interlinkage magnetic flux of the rotary electric machine passes is formed outside the magnet accommodating hole of each of the magnetic pole portions.

3. The rotor for the rotary electric machine according to claim 1, wherein:
the at least one core protrusion comprises a plurality of core protrusions;
the plurality of core protrusions is formed between the wall portion of the magnet accommodating hole and at least one of the first main surface and the second main surface of the permanent magnet; and
the at least one nonmagnetic portion is formed between the plurality of core protrusions.

4. The rotor for the rotary electric machine according to claim 1, wherein:
   the at least one nonmagnetic portion comprises a plurality of nonmagnetic portions;
   when viewed in the axial direction, the saturation portion includes the at least one core protrusion and the plurality of nonmagnetic portions formed with the at least one core protrusion interposed therebetween.

5. The rotor for the rotary electric machine according to claim 1, wherein
   a proportion of the at least one core protrusion formed by the part of the rotor core in the saturation portion is 20% or higher and 60% or lower.

6. The rotor for the rotary electric machine according to claim 1, wherein:
   when viewed in the axial direction, the saturation portion includes a main surface extending to face at least one of the first main surface and the second main surface of the permanent magnet, and a pair of side surfaces extending from both end portions of the main surface toward the wall portion of the magnet accommodating hole while facing outward in an extending direction of the saturation portion;
   the pair of side surfaces are formed to be exposed to inside of the magnet accommodating hole; and
   the permanent magnet is disposed in the magnet accommodating hole at a position where both end portions of the first main surface or the second main surface of the permanent magnet are spaced apart from the wall portion of the magnet accommodating hole when viewed in the axial direction.

* * * * *